US008451898B2

(12) United States Patent
Saigo et al.

(10) Patent No.: US 8,451,898 B2
(45) Date of Patent: May 28, 2013

(54) MOTION VECTOR ESTIMATION APPARATUS

(75) Inventors: Katsuo Saigo, Hyogo (JP); Tatsuro Juri, Osaka (JP); Hideyuki Ohgose, Osaka (JP); Koji Arimura, Osaka (JP); Hiroshi Arakawa, Nara (JP); Kei Tasaka, Nara (JP); Yuuki Maruyama, Osaka (JP)

(73) Assignee: Panasonic Corporation, Osaka (JP)

( * ) Notice: Subject to any disclaimer, the term of this patent is extended or adjusted under 35 U.S.C. 154(b) by 1532 days.

(21) Appl. No.: 11/591,451

(22) Filed: Nov. 2, 2006

(65) Prior Publication Data

US 2007/0110161 A1 May 17, 2007

(30) Foreign Application Priority Data

Nov. 2, 2005 (JP) ................................ 2005-320189

(51) Int. Cl.
*H04N 11/02* (2006.01)
*H04N 11/04* (2006.01)

(52) U.S. Cl.
USPC ............. 375/240.16; 375/240.15; 375/240.24

(58) Field of Classification Search
None
See application file for complete search history.

(56) References Cited

U.S. PATENT DOCUMENTS 5,132,792 A 7/1992 Yonemitsu et al.
RE37,222 E 6/2001 Yonemitsu et al.
7,233,621 B2 * 6/2007 Jeon ......................... 375/240.15
7,660,354 B2 * 2/2010 Shi et al. .................. 375/240.15
7,660,471 B2 * 2/2010 Bjontegaard .................. 382/232
2005/0226332 A1 * 10/2005 Uetani ..................... 375/240.16
2008/0069234 A1 * 3/2008 Kadono et al. ........... 375/240.16
2008/0069235 A1 * 3/2008 Abe et al. ................. 375/240.16
2009/0034621 A1 * 2/2009 Joch et al. ................ 375/240.16
2010/0118969 A1 * 5/2010 Kondo et al. ............ 375/240.16

FOREIGN PATENT DOCUMENTS

JP 03-129984 6/1991
JP 04-150284 5/1992
JP 09-168153 6/1997
JP 2830183 9/1998
JP 10-341440 12/1998
JP 3335137 8/2002

(Continued)

OTHER PUBLICATIONS

ITU-T Recommendation H.264 (Mar. 2005): "Advanced video coding for generic audiovisual services," Telecommunication Standardization Sector of International Telecommunication Union.

(Continued)

*Primary Examiner* — Joseph Ustaris
*Assistant Examiner* — Frederick Bailey
(74) *Attorney, Agent, or Firm* — McDermott Will & Emery LLP

(57) ABSTRACT

The present invention provides a motion vector estimation apparatus which can decrease circuit size by reducing the amount of computations for detecting a motion vector. The motion vector estimation apparatus in the present invention includes a motion vector estimation unit which estimates a motion vector MV0F for the target block BL0 by searching within a reference picture P1 for a block with an image similar to an image in the target block BL0, which is included in a picture B2; a prediction calculation unit and a prediction range control unit which specify a search range in the reference picture P1 based on the motion vector MV0F and; the motion vector estimation unit estimates the motion vector MV1F for the target block BL1 by searching in the search range for a block with an image similar to an image in the target block BL1, which is included in the picture B3.

7 Claims, 27 Drawing Sheets

FOREIGN PATENT DOCUMENTS

| | | |
|---|---|---|
| JP | 2004-173009 | 6/2004 |
| JP | 2006-136011 | 5/2006 |

OTHER PUBLICATIONS

Richardson, Iain E.G., H.264 and MPEG-4 Video Compression "Video Coding for Next generation Multimedia," WILEY.

Chinese Office Action issued in Chinese Patent Application No. CN 2006101380215, dated Oct. 9, 2009.

Japanese Office Action issued in Japanese Patent Application No. 2005-320189, mailed Jul. 27, 2010.

Japanese Office Action issued in Japanese Patent Application No. 2005-320189, mailed Mar. 29, 2011.

* cited by examiner

PRIOR ART

PRIOR ART

PRIOR ART

PRIOR ART

PRIOR ART

MOTION VECTOR ESTIMATION APPARATUS

BACKGROUND OF THE INVENTION (1) Field of the Invention

The present invention is a motion vector estimation apparatus used for inter-picture prediction coding of a moving picture made up of plural pictures and relates to a motion vector estimation apparatus for estimating a position in another picture from which a block has moved, and expressing the motion with motion vectors.

(2) Description of the Related Art

Generally, in picture coding, an amount of information is compressed by using redundancies in spatial direction and temporal direction in moving pictures. Thus, inter-picture prediction coding is used as a method of utilizing redundancies in temporal direction. When coding a picture with inter-picture prediction coding, a picture at the front or the back of the display order is selected as a reference picture. Next, motion vectors are estimated from the reference picture, and the amount of information is compressed by removing redundancies in spatial direction relative to a difference value between a picture, on which motion compensation is performed, and a picture targeted for coding.

In motion picture encoding methods such as MPEG, a picture which performs intra-picture prediction coding using only a picture to be coded without a reference picture is called an I picture. Here, a picture represents an encoding basis which includes both a frame and a field. A picture which is intra-frame prediction coded by referencing a frame that has already been coded is called a P picture, and a picture which is inter-frame prediction coded by referencing two frames that have already been coded is called a B picture.

FIG. 1 is a schematic diagram which shows the prediction relationships for each picture in a motion picture coding scheme. In FIG. 1, a vertical line indicates a picture and, at the bottom right of each picture, a picture type (I, P, B) is shown. The arrows in FIG. 1 indicate that the picture at the tip of the arrow is inter-picture prediction coded using the picture at the rear of the arrow as a reference picture. For example, the second B picture from the top of the order is encoded using the I picture at the top of the order and the fourth P picture from the top of the order as reference pictures.

FIG. 2 is a diagram which shows the display sequence and the coding sequence of the pictures.

As shown in (a) of FIG. 2, the display sequence for the pictures is P picture P1, B picture B2, B picture B3, P picture P4, B picture B5, B picture B6, P picture P7, B picture B8, B picture B9 and P picture P10. On the other hand, the coding sequence for these pictures is B picture B1, P picture P4, B picture B2, B picture B3, P picture P7, B picture B5, B picture B6, P picture P10, B picture B B8 and B picture B9.

Note that in comparison to conventional moving picture coding schemes such as MPEG-2, in the latest version of the moving picture coding scheme H.264, a B picture may reference more than three B pictures.

FIG. 3 is a diagram which shows the reference relationships in H.264.

As shown in FIG. 3, a B pictures references, for instance, a P picture that is two pictures ahead and a P picture that is one picture behind the B picture in the display order. Next, the motion vectors in the B picture are estimated. In this way, for H.264, the number of reference pictures which can be referenced for estimating motion vectors relative to the same B picture is larger than MPEG2 (see for example Non-Patent Document 1, ITU-T Recommendation H.264(03/2005): "Advanced video coding for generic audiovisual services", ITU-T and Non-Patent Document 2, H.264 and MPEG-4 Video Compression "Video Coding for Next generation Multimedia" WILEY.

However, motion vector estimation in inter-picture prediction coding is performed on a block basis. For every block included in the picture targeted for coding, a block with an image nearest the image in the block is searched for among the reference pictures. Thus, in motion vector estimation, the motion vector estimation search range is set in advance in consideration of the normal computation load and the accuracy of the motion vector. Thus, a case where a target moves along with the lapsing of time is anticipated and is compared to the distance between the picture to be coded and the reference picture, and the search range for the motion vector must be expanded.

FIG. 4 is a diagram which shows search ranges for motion vector estimation.

For example, when the distance (inter-picture distance) between the picture to be coded and the reference picture is 1, and the motion vector search range is ±S×±S, once the inter-picture distance becomes d, the search range for the motion estimation search range becomes (dx±S)×(dx±S). In this way, the search range expands by d×d times. In other words, when the inter-picture distance lengthens, the search range expands in proportion to the rate of change in the distance squared.

As shown in FIG. 4, when the motion vectors MV1, MV2 and MV3 for the block included in the (n+3)th picture to be coded are estimated using an nth reference picture, an (n+1)th reference picture or an (n+2)th reference picture, the search range of the (n+1)th reference picture is 2×2 times the search range of the (n+2)th reference picture and the search range for the nth reference picture is 3×3 times the search range of the (n+2)th reference picture.

Thus, when the inter-picture distance increases, the search range for the motion vectors expands sharply and the amount of computations becomes enormous. Thus, in order to decrease the amount of computations, motion vector estimation apparatuses have been proposed which estimate motion vectors by telescopic searches (see for example, Patent Document 1, Japanese Patent Publication No. 2830183, Patent Document 2, Japanese Patent Publication No. 3335137 and Patent Document 3, Japanese Laid-Open Patent No. H10-341440 Publication).

A telescopic search is a method for estimating motion vectors by successively searching for motion in a picture that is between a reference picture and a picture to be coded. In this method, even if the inter-picture distance lengthens, the search range expands proportionally by the rate of change in the distance, not by the ratio of the change in the distance squared.

FIG. 5 is a diagram which shows a telescopic search.

For example, the motion vector for a block (target block) included in the (n+3)th picture to be coded is estimated using the nth reference picture. In this case, for the telescopic search, a motion vector v1 is estimated relative to the (n+2)th picture from the (n+3)th picture using a search range (±S×±S) centered on the same position as the target block in the (n+2) th picture. Next, a motion vector v2+v1 is estimated relative to pictures from the (n+3)th picture to the (n+1)th picture using a search range (±S×±S) centered on the position indicated by the motion vector v1 in the (n+1)th picture. In the same way, the motion vector v3+v2+v1 is estimated from the (n+3)th picture to the nth picture, using the search range (±S×±S) centered on a position indicated by the motion vectors v2+v1 in the nth picture. This motion vector is the motion vector v0 for the target block. In other words, the overall search range becomes 3×(±S×±S).

However, there is the problem that when the motion vector estimation apparatuses in Patent Document 1 through 3 perform a telescopic search, the amount of computations is large.

In other words, in a telescopic search, the search range in each picture is fixed by performing successive motion searches on pictures between a reference picture and a picture to be coded without regard to the respective picture distances. However, in a telescopic search, motion searches are performed successively for pictures between a reference picture and a picture to be coded, and therefore since the reference pictures as well as unrelated pictures in between must be referenced, the number of references will be proportional to the inter-picture distance. Accordingly, the overall search range increases proportionally to the inter-picture range and as a result, the amount of computations increases when estimating motion vectors.

Further, there is the problem that circuit size increases in a motion vector estimation apparatus that performs the telescopic search. In other words, for the motion vector estimation apparatus, the amount of data in the search range for estimating a motion vector, which is read out from the memory storing the reference picture, is large. As a result, for the motion vector estimation apparatus, circuit size increases due to accelerating the memory transfer operation clock and expanding the memory bandwidth (bit width).

FIG. 6 is a diagram which shows changes in the search range in a reference picture. A search range TA1 in a reference picture RP1 for a target block (commonly, a macroblock, for instance, a block composed of 16 pixels×16 lines) is a range centered on a block TB1 which is co-located with a target block in the reference picture RP1. Thus, the reference picture RP1 is composed from horizontal H pixels and vertical V lines, and the search range TA1 is composed of horizontal h pixels and vertical v lines. Accordingly, when estimating a motion vector for the target block, data for the horizontal h pixels and the vertical v lines are read out of the memory.

Next, when the target block shifts in a horizontal direction, the search range TA2 in the reference picture RP1 for the target block becomes a range centered on a block TB2 co-located with the target block in the reference picture RP1. Accordingly, when the target block shifts in a horizontal direction, the search range also shifts by a block width w. In this case, the data read out of the memory when estimating the motion vector for the target block is made up only of data from the search range TA2 that is not included in the search range TA1. In other words, the data newly read out of the memory is data made up of 16 pixels and vertical v lines.

In this way, when the target block shifts in a horizontal direction, only data that is not included in the previous search range is read out of the memory, not all of the data included in the new search range.

For a telescopic search, data in the search range is read out of the memory for pictures which are mutually adjacent as above. However, in this case, the search range for every picture does not always shift by just the width of the block, the search range may shift widely. Thus, even if data in the search range is read out of the memory, motion vector estimation is performed and the data is accumulated for estimating the next motion vector, most of the data in the new search range must be read out of the memory since there is little overlapping information. Accordingly, in a telescopic search, the amount of data transferred from the memory increases. As a result, power consumption rises.

SUMMARY OF THE INVENTION

Thus, the present invention is conceived in consideration of the problems above and has as an object providing a motion vector estimation apparatus that reduces the amount of computations for estimating motion vectors and circuit size can be decreased.

In order to carry out the above objects, the motion vector estimation apparatus in the present invention is a motion vector estimation apparatus which estimates a motion vector for a target block included in a picture that includes a first motion estimation unit which estimates a first motion vector for a target block included in a first picture by searching within a reference picture for a block with an image similar to an image in the target block included in the first picture; a search range specification unit which specifies a search range in the reference picture based on the first motion vector; and a second motion estimation unit which estimates a second motion vector for a target block included in a second picture by searching within the search range for a block with an image similar to an image in the target block included in the second picture. For example, the search range specification unit includes: a prediction computation unit which calculates a prediction motion vector for the target block in the second picture by scaling the first motion vector according to a time difference between display times of the first and second picture and the reference picture; and a specification unit which specifies as the search range a range in the reference picture indicated by the prediction motion vector, which is calculated by the prediction computation unit.

When the display time for the first and second pictures are near one another and the target blocks which are included in the respective pictures are spatially co-located, the orientations of the first and second vectors will equalize. Therefore, in the present invention, a search range for estimating the second motion vector can be specified appropriately since the search range is specified based on the first motion vector just as, for example, the search range is specified by calculating the prediction motion vector from the first motion vector. As a result, even when the second picture differs from the reference picture in terms of display time, a motion vector for the target block in the second picture can be estimated in an appropriate search range without expanding the search range in the reference picture. Also, in the present invention, it is not necessary to directly estimate motion vectors as in a telescopic search. As a result, the entire search range in the present invention can be reduced. Further, in the present invention, when shifting the target block in the second picture to estimate a second motion vector for each target block, the transfer data load from the memory (picture memory) can be reduced compared to a telescopic search; the memory storing the reference picture. In other words, even when there is another picture between a reference picture and a second picture in the display order, there is no need to read out the data for a search range in the other picture in the present invention, and further, by shifting the target block for the second picture to estimate the second motion vector for each target block, the search range read out previously can be used effectively and it is possible to reduce the amount of data newly read out of the memory.

Accordingly, in the present invention, since a search range can be limited to an appropriate range, it is possible to reduce the amount of computations for estimating a motion vector, and since the transferred data load from the memory can be reduced, circuit size can be decreased.

Also, the prediction computation unit may calculate the prediction motion vector for the target block in the second picture which is spatially co-located with the target block in the first picture, and the second motion estimation unit may estimate the second motion vector for the target block in the second picture that is spatially co-located with the target block in the first picture.

Thus, since the target block in the first picture and the target block in the second picture are spatially co-located, the prediction motion vector can approach the second motion vector. In other words, it is possible to improve the accuracy of prediction motion vectors and as a result, specify a more appropriate search range.

Also, the first motion estimation unit may estimate a first motion vector for a target block included in each first picture, and the search range specification unit may specify a search range in the reference picture based on a first motion vector in a picture, among first pictures, with the shortest time difference in display time from the second picture.

Thus, when there are plural first motion vectors, since the search range is specified based on a first motion vector in a first picture, which is near the second picture in terms of display time, an appropriate search range can be specified, despite the plural first motion vectors.

Also, the specification unit may specify the range in the reference picture indicated by the prediction motion vector, and a block in the reference picture spatially co-located with the target block in the second picture, as the search range.

Thus, by including a block in the reference picture, that is spatially co-located with the target block in the second picture, into the search range, even if there is not a block with an image similar to the image in the target block in the second picture, which is within the range in the reference picture that is indicated by the prediction motion vector, it is possible to search for the block within another range and estimate an appropriate second motion vector.

Also, the first or second motion estimation unit may estimate a first or second motion vector for a target block included in the first or the second picture while another target block in the first or the second picture is being coded using another first or second motion vector, which has already been estimated.

Thus, when a motion vector estimation apparatus is built into a moving picture coding apparatus, processing time can be reduced overall given that coding and motion estimation processes are pipelined.

Note that the present invention can be realized not only as a motion vector estimation apparatus, but also as a motion vector estimation method, a recordable media in which a motion vector estimation program is stored and an integrated circuit.

The motion vector estimation apparatus in the present invention performs the functional effect of allowing a reduction in the amount of computations for estimating motion vectors by shrinking the search range for motion vectors, and by reducing the amount of data read out from the external memory, allows for increased efficiency in power usage and a decrease in circuit size.

FURTHER INFORMATION ABOUT TECHNICAL BACKGROUND TO THIS APPLICATION

The disclosure of Japanese Patent Application No. 2005-320189 filed on Nov. 2, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT

Below, a moving picture coding apparatus that includes a motion vector estimation apparatus in the embodiment of the present invention is described with reference to figures.

Figure 7:
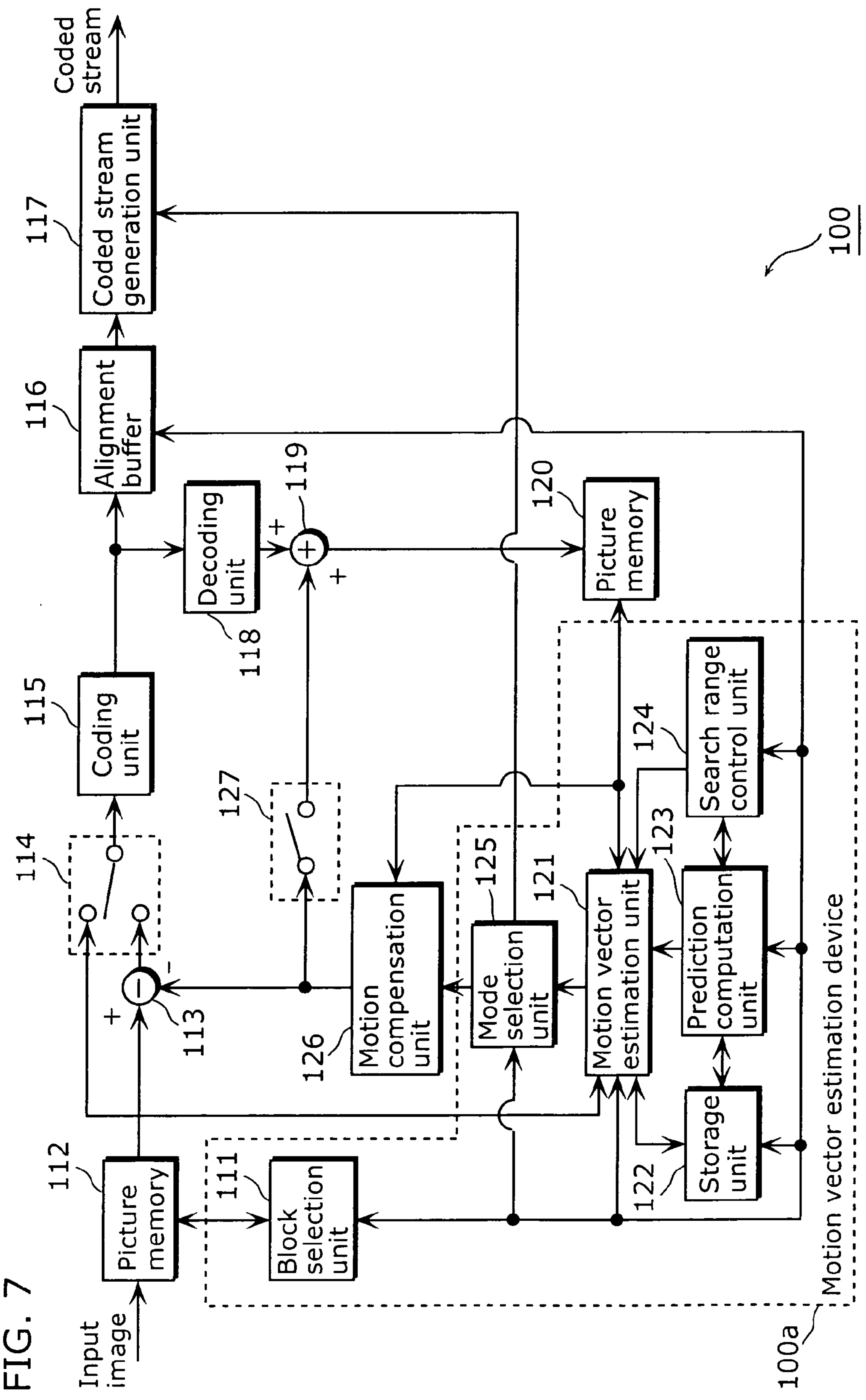
FIG. 7 is a block diagram of the moving picture coding apparatus which includes a motion vector estimation apparatus in the embodiment of the present invention.

FIG. 7 is a block diagram of a moving picture coding apparatus that includes a motion vector estimation apparatus in the embodiment of the present invention.

The moving picture coding apparatus 100 includes, as shown in FIG. 7, picture memories 112 and 120, a block selection unit 111, a difference calculation unit 113, switches 114 and 127, a coding unit 115, an alignment buffer 116, a coded stream generation unit 117, a decoding unit 118, an addition computation unit 119, a motion vector estimation unit 121, a storage unit 122, a prediction computation unit 123, a search range control unit 124, a mode selection unit 125 and a motion compensation unit 126.

Figure 1:
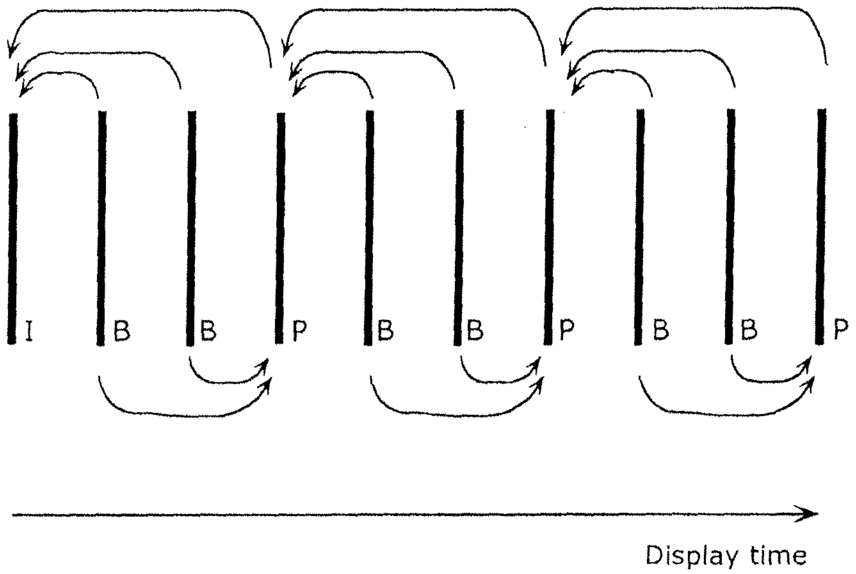
FIG. 1 is a schematic diagram which shows a prediction relationship for each picture in the moving picture coding scheme.
Figure 2:
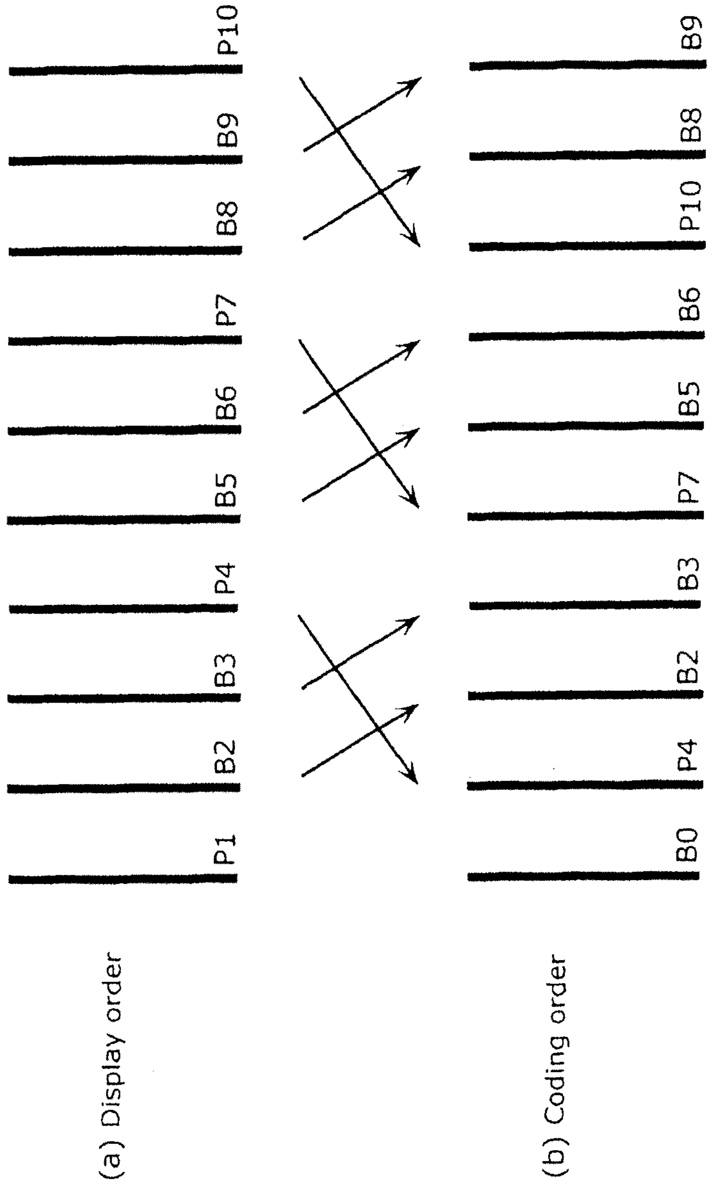
FIG. 2 is a diagram which shows the display order and the coding order of the pictures.
Figure 3:
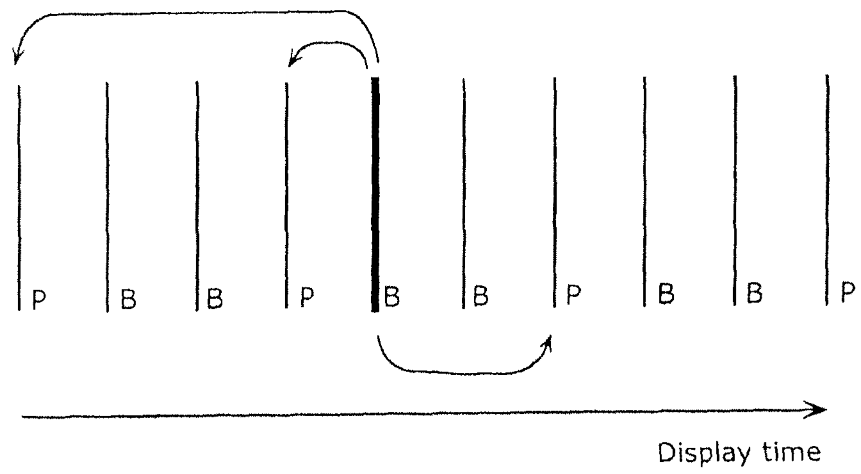
FIG. 3 is a diagram which shows reference relationships under H.264.
Figure 4:
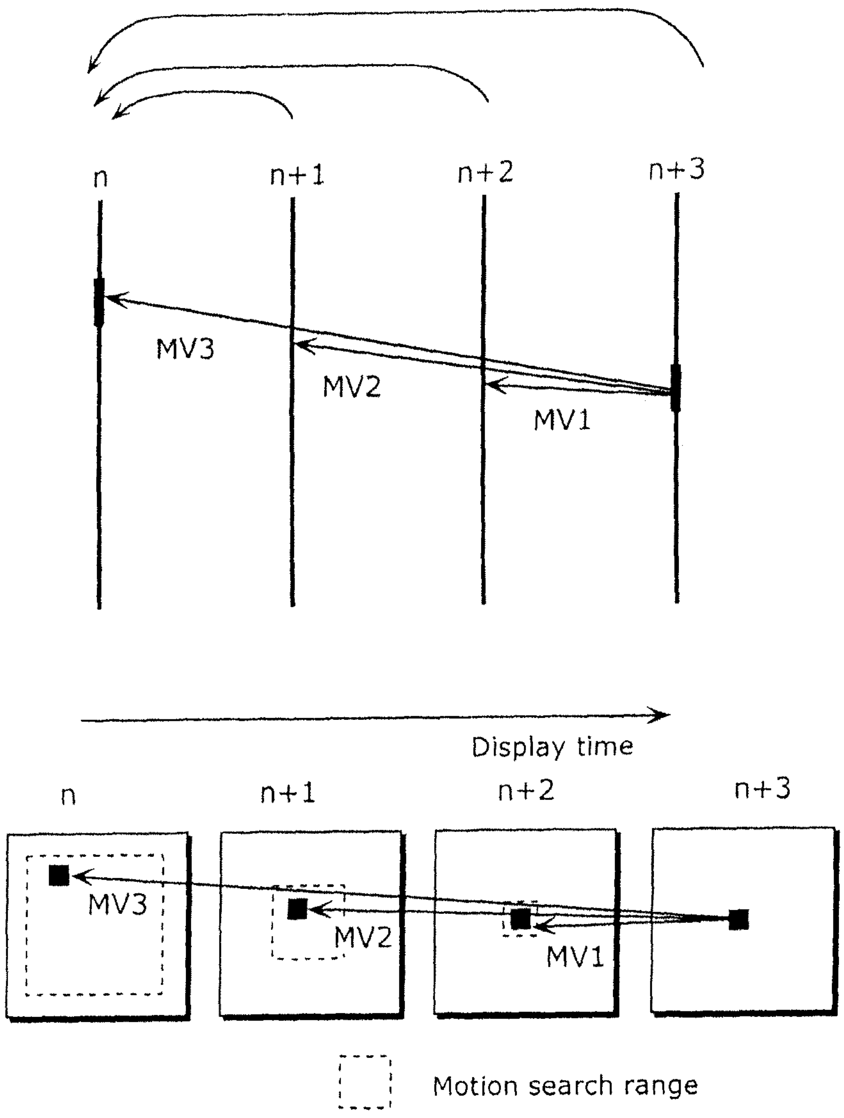
FIG. 4 is a diagram which shows the search range for conventional motion vector estimation.
Figure 5:
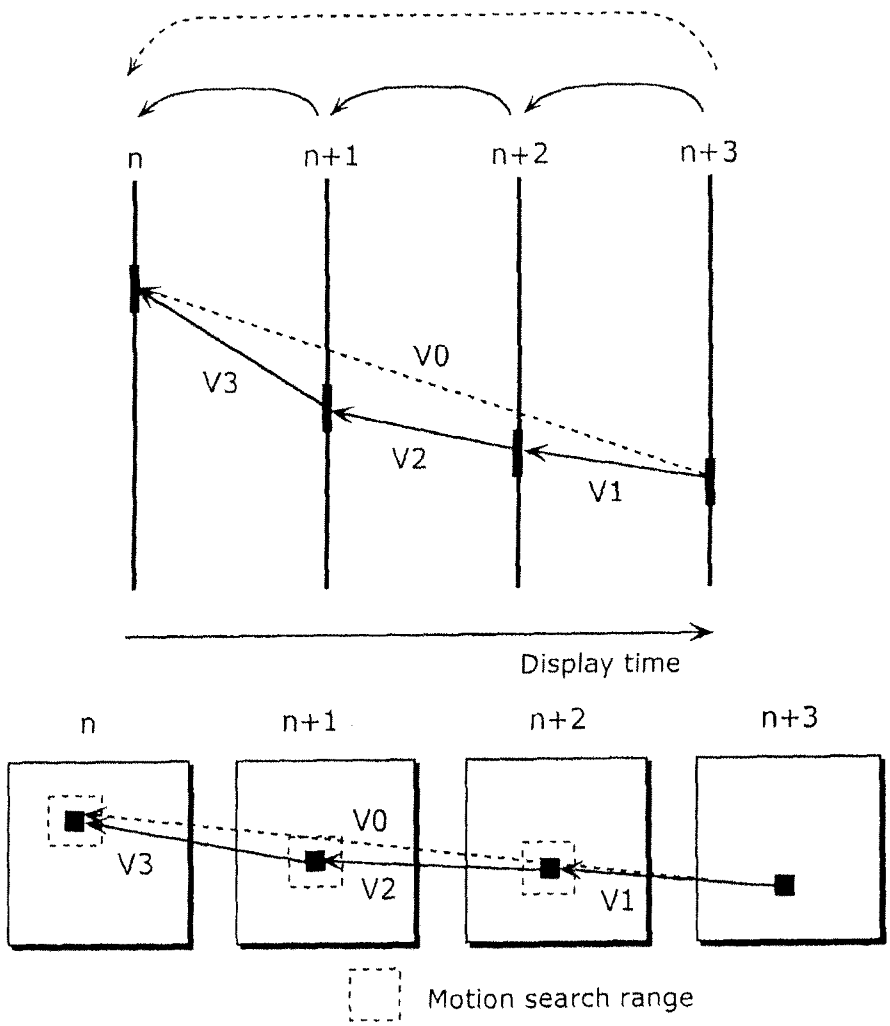
FIG. 5 is a diagram which shows a telescopic search.
Figure 6:
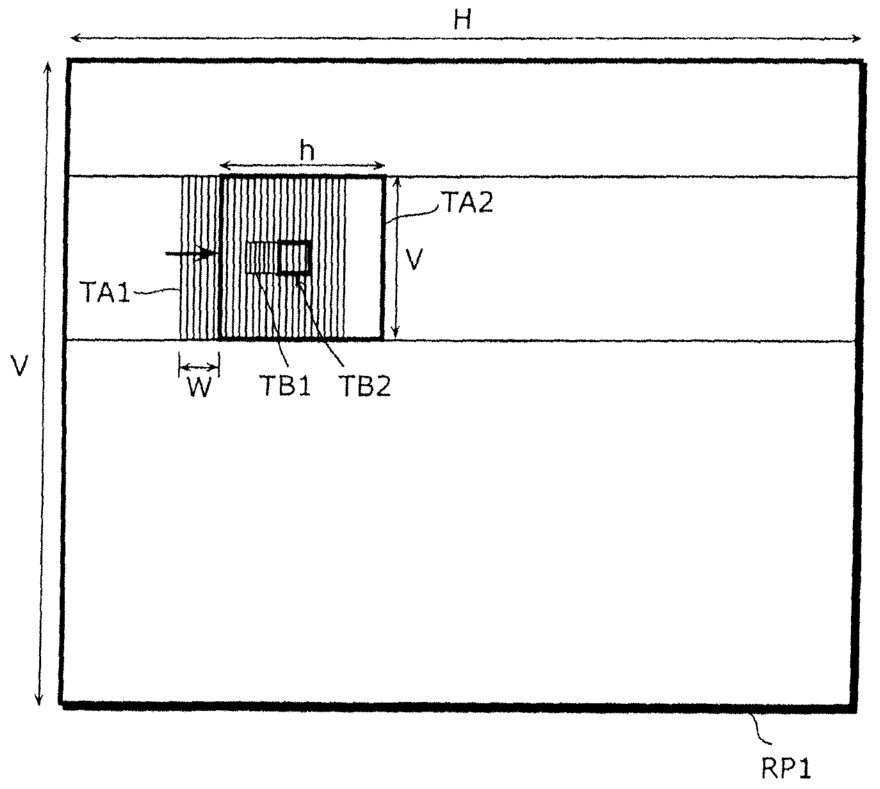
FIG. 6 is a diagram which shows changes in the search range in a reference picture.

The picture memory 112 acquires and stores plural input pictures (pictures), which show a moving picture, in a display order as shown in FIG. 2. Next, the picture memory 112 outputs a target block (blocks targeted for motion vector estimation or for coding) for each picture selected by the block selection unit 111 to the difference computation unit 113, the switch 114 and the motion vector estimation unit 121.

The block selection unit 111 selects, from the pictures stored in the picture memory 112, a unit of consecutive pictures, for instance, a unit consisting of pictures P1, B2, B3, and P4 as shown in FIG. 2. Further, the block selection unit 111 controls the picture memory 112 so that it will select and output a target block at a predetermined position from each picture. Also, the block selection unit 111 outputs the position information for the target block chosen, as well as display order information, for a picture (a target picture) in which the target block is included, to the motion vector estimation unit 121, the storage unit 122, the prediction computation unit 123, the search range control unit 124 and the alignment buffer 116.

The difference computation unit 113 calculates the difference between the image in the target block, which is included in the input image, and the predicted image outputted from the motion compensation unit 126, then outputs the calculated result as a prediction residual image.

The switch 114 outputs the target block to the coding unit 115 when intra-picture prediction coding is performed on the target block, and outputs the prediction residual image from the residual computation unit 113 to the coding unit 115 when inter-picture prediction coding is performed on the target block.

The switch 127 outputs the predicted image from the motion compensation unit 126 to the addition computation unit 119 only when inter-picture processing is performed on the target block.

The coding unit 115 generates a coded signal by performing a coding process such as frequency transformation and quantization on the target block or the prediction residual image outputted from the switch 114.

The alignment buffer 116 outputs the coded signal to the coded stream generation unit 117 by arranging the pictures included in the coded signal in rank according to the coding standard.

The coded stream generation unit 117 performs variable length coding, and so on, on the coded signal outputted from the alignment buffer 116. Further, upon acquiring information which indicates a motion vector from the mode selection unit 125, or a motion prediction mode (as described below, direct mode selection information) and so on, the coded stream generation unit 117 generates a coded stream by affixing the information which indicates the motion vector or the motion prediction mode to a coded signal that has been variable length-encoded.

The decoding unit 118 generates a decoded picture by performing a decoding process such as inverse-quantization or inverse frequency transformation on the coded signal outputted from the coding unit 115.

The addition computation unit 119 generates a reconstructed picture by adding the decoded picture outputted from the decoding unit 118 to the prediction picture outputted, via the switch 127, from the motion compensation unit 126.

The picture memory 120 stores, in order, the reconstructed picture generated and outputted by the addition computation unit 119. As a result, reference pictures are stored in the picture memory 120.

The motion vector estimation unit 121 acquires the target block outputted from the picture memory 112. The motion vector estimation unit 121 also reads out the search range in the reference picture for the target block from the picture memory 120. Next, the motion vector estimation unit 121 estimates a motion vector which indicates image motion in the target block (a motion vector for the targeted in the reference picture), by searching within the search range for a block with an image that approximates the image in the target block.

The prediction computation unit 123 predicts a motion vector for the target block by using temporal direct mode, described below, and calculates the predicted motion vector.

The search range control unit 124 specifies the search range in the reference picture and defines the search range in the motion vector estimation unit 121 based on the prediction motion vector calculated by the prediction computation unit 123.

The storage unit 122 has an area for storing the motion vector estimated by the motion vector estimation unit 121.

The mode selection unit 125 selects a motion prediction mode. In other words, the mode selection unit 125 selects either a temporal direct mode or a non-temporal direct mode. Next, when selecting the non-temporal direct mode, the mode selection unit 125 outputs the motion vector estimated by the motion vector estimation unit 121 to the coded stream generation unit 117 and, when selecting the temporal direct mode, the mode selection unit 125 outputs direct mode selection information, which provides notification that the temporal direct mode has been selected, to the coded stream generation unit 117.

The motion vector estimation apparatus 100*a* in the present embodiment is characterized in that its circuit size can be decreased by reducing the amount of computation for motion vector estimation. The motion vector estimation apparatus 100*a* in the present embodiment includes the block selection unit 111, the mode selection unit 125, the motion vector estimation unit 121, the storage unit 122, the prediction computation unit 123 and the search range control unit 124. Further, in the present embodiment, the motion vector estimation unit 121 is composed of a first motion vector estimation unit which estimates a first motion vector, and a second motion vector estimation unit which estimates a second motion vector; the prediction computation unit 123 and the search range control unit 124 are composed as a search region specification unit which specifies a search range in the reference picture based on the first motion vector. Also, in the present embodiment, the prediction computation unit 123 is composed as a prediction computation unit and the search range control unit 124 is composed as a specification unit for specifying a range in the reference picture, which is indicated by the prediction motion vector, as a search range.

A typical temporal direct mode is described in detail below. In the H.264 format, for coding a B picture, a coding mode known as direct mode can be selected in order to reduce motion vector information. In this direct mode, there are two types of methods: temporal and spatial. In the temporal direct mode, the target block itself does not have a motion vector. A motion vector for the target block is predicted and generated by taking a motion vector for another picture which has been coded as a reference motion vector, and by performing scaling based on position relationships in terms of a display time among the pictures.

Figure 8:
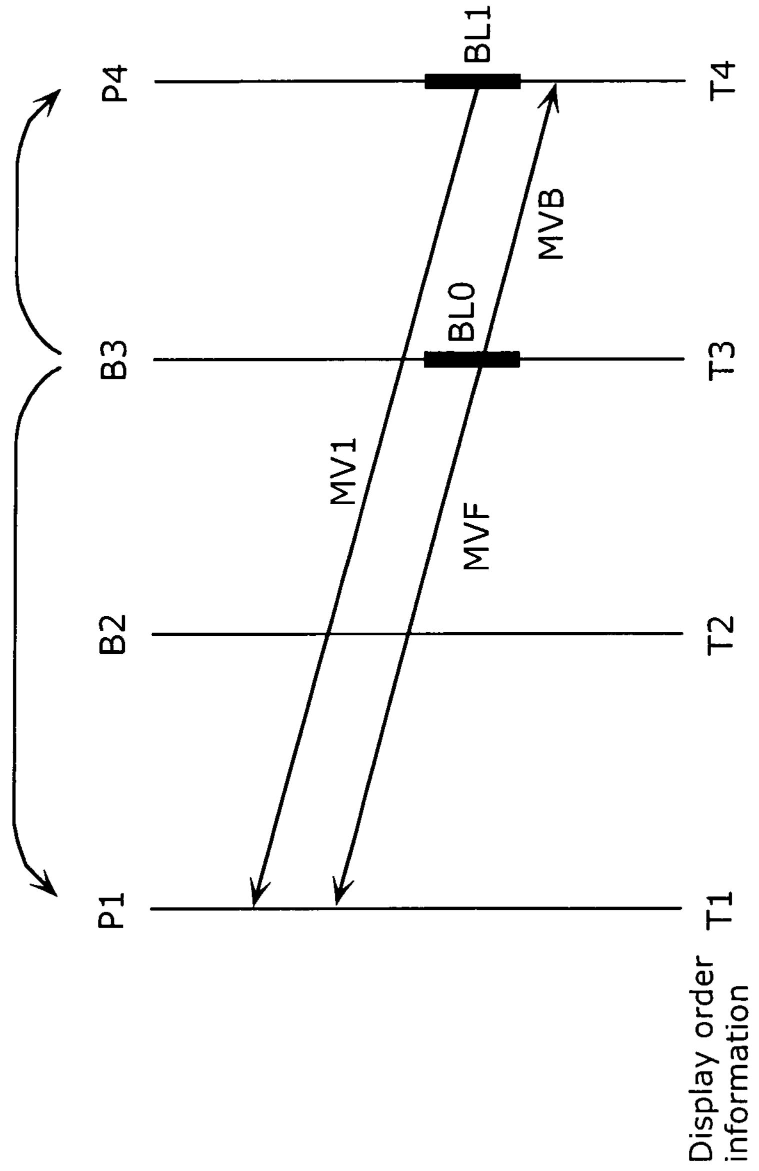
FIG. 8 is a schematic diagram which shows a prediction generation method for the motion vector in a temporal direct mode.

FIG. 8 is a schematic diagram which shows a prediction generation method for the motion vector in the temporal direct mode. Note that among the reference marks such as P1, B2 and so on shown in FIG. 8, P stands for P picture, B stands for B picture, and the numbers stand for the display order for each picture. Additionally, each picture P1, B2, B3 and P4 has its own display order information T1, T2, T3 and T4. In other words, each picture is displayed in the order: picture P1, picture B2, picture B3 and picture P4.

Below, a block BL0 in the picture B3 is coded using the temporal direct mode. In this case, a motion vector MV1 is utilized, the motion vector MV1 being a motion vector for the block BL1, which is co-located with the block BL0 in the picture 4, which is a picture which has been coded and is positioned near the picture B3 in terms of display time. The motion vector MV1 is a motion vector utilized when the block BL1 is coded, and takes the picture P1 as a reference picture.

Thus, in the temporal direct mode, by applying the motion vector MV1 to an (Equation 1a) and an (Equation 1b) below, a motion vector (forward motion vector) MVF for the block BL0 relative to the picture P1, and a motion vector (backward motion vector) MVB for the block BL0 relative to the picture P4 are calculated. Note that in the (Equation 1a) and the (Equation 1b), Mv expresses the size of the motion vector MV1, Mvf expresses the size of the motion vector MVF, and Mvb expresses the size of the motion vector MVB.

$$Mvf=(T3-T1)/(T4-T1)\times Mv \quad \text{(Equation 1a)}$$

$$Mvb=(T4-T3)/(T4-T1)\times Mv \quad \text{(Equation 1b)}$$

In this way, in the temporal direct mode, motion compensation is performed for the block BL0, which takes the picture P1 and the picture P4 as reference pictures, using the motion vector MVF and the motion vector MVB, which are obtained by scaling the motion vector MV1. Thus, by simply including information which indicates that temporal direct mode has been selected, there is no need to code and include motion vectors for the block BL0 in a coded stream; as a result, the bit rate of the coded stream can be reduced.

In the motion vector estimation apparatus 100*a* in the present embodiment, motion vectors are predicted for a target block by the temporal direct mode as described above. In other words, the motion vector estimation apparatus 100*a* in the present embodiment calculates a prediction motion vector for the target block, specifies a search range in the reference picture from the prediction motion vector and estimates a motion vector within the search range.

Figure 9:
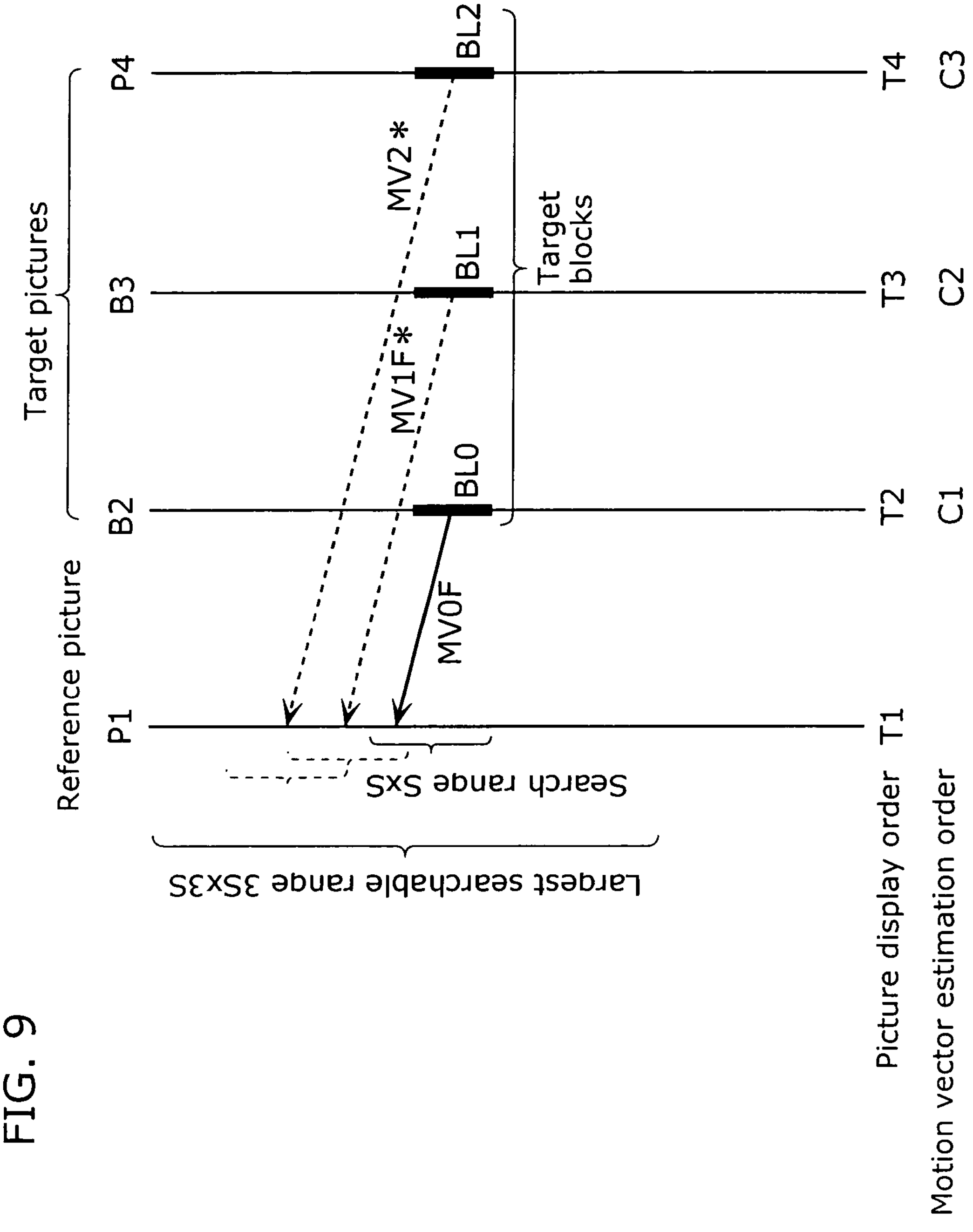
FIG. 9 is an explanatory diagram for describing the forward prediction vectors calculated by the prediction computation unit in the embodiment of the present invention.

FIG. 9 is an explanatory diagram for describing a forward prediction motion vector calculated by the prediction computation unit 123 in the present embodiment. Note that in FIG. 9, codes P1 and P4 indicate P pictures, and codes B2 and B3 indicate B pictures. Also, the digits in these reference marks indicate the display order for each picture. Each picture P1, B2, B3 and P4 has display order information T1, T2, T3 and T4 respectively. This display order information indicates the display order and the display time for each picture.

The motion vector estimation unit 121 first estimates a motion vector MV0F (a first motion vector) for the target block BL0 in the picture B2, which is a first picture. That is, the motion vector estimation unit 121 estimates the motion vector MV0F which denotes the block by searching for a block which has an image most similar to the image in the target block BL0, within a search range (partial range) of S pixels by S lines in the reference picture P1, centered on the same position as the target block BL0 in the picture B2. Next, the motion vector estimation unit 121 stores the motion vector MV0F in the storage unit 122.

The prediction computation unit 123 reads out the motion vector MV0F from the storage unit 122 and calculates a forward prediction motion vector MV1F* and a prediction motion vector MV2* relative to the target blocks BL1 and BL2, by scaling the motion vector MV0F; the target blocks BL1 and BL2 being co-located (identical spatial position) with the target block BL0 in the picture B3 and the picture P4, which are second pictures.

More specifically, the prediction computation unit 123 uses the display order information T1, T2, T3 and T4 for the pictures P1, B2, B3 and P4 to calculate the prediction motion vector MV1F* for the target block BL1, relative to the reference picture P1, in the picture B3, and the prediction motion vector MV2*, relative to the reference picture P1, for the reference block BL2 in the picture P4 using an (Equation 2a) and an (Equation 2b) below. Note that in the (Equation 2a) and the (Equation 2b), Mv1*f and Mv2*** indicate respectively the size of the prediction motion vectors MV1F* and MV2*, and Mv0F indicates the size of the motion vector MV0F.

$$Mv1f^*=(T3-T1)/(T2-T1)\times Mv0F \quad \text{(Equation 2a)}$$

$$Mv2^*=(T4-T1)/(T2-T1)\times Mv0F \quad \text{(Equation 2b)}$$

Thus, when the display time interval (time difference between display times) for each picture P1, B2, B3 and P4 is an equidistant interval, (3×S) pixels by (3×S) lines becomes the largest searchable range in the reference picture P1. In other words, when the display time interval between the picture B2 and the reference picture P1 is (T2−T1)=1, (T4−T1) =3 becomes the display time interval between the reference picture P1 and the picture P4. Accordingly, when the search range for the motion vector MV0F in the picture B2 is S pixels by S lines, (3×S) pixels by (3×S) lines becomes the largest searchable range. In this way, the largest searchable range is the longest time difference among the time differences in the display times between each target picture and the reference picture P1.

The prediction computation unit 123 outputs the prediction motion vectors MV1F* and MV2F* calculated in this way to the search range control unit 124.

The search range control unit 124 specifies a search range indicated by the prediction motion vector MV1F* in the reference picture P1 and defines the search range in the motion vector estimation unit 121. In other words, the search range control unit 124 defines a search range of S pixels by S lines centered on the position in the reference picture P1 indicated by the prediction motion vector MV1F*. The search range control unit 124 specifies the search range indicated by the prediction motion vector MV2* in the reference picture P1 and defines this in the motion vector estimation unit 121. In other words, the search range control unit 124 defines a search range of S pixels by S lines centered on a position in the reference picture P1 indicated by the prediction motion vector MV2*. In this way, the search range control unit 124 specifies a search range of S pixels by S lines from the largest possible search range with the same size as the search range (partial range) of the motion vector MV0F for the target block BL0, in order to estimate motion vectors for the target blocks BL1 and BL2.

The motion vector estimation unit 121 reads out, from the picture memory 120, each search range in the reference picture P1 defined by the search range control unit 124, and estimates the forward motion vector for the target block BL1 (second motion vector) and the motion vector for the target block BL2 (second motion vector) within the respective search ranges. In other words, after estimating a forward motion vector for the target block BL0 relative to the reference picture P1, the motion vector estimation unit 121 estimates the forward motion vector for the target block BL1 relative to the reference picture P1, and next estimates the forward motion vector for the target block BL2 relative to the reference picture P1. Thus, the motion vector estimation unit 121 stores the motion vectors of the target block BL1 and the target block BL2 respectively in the storage unit 122.

Figure 10:
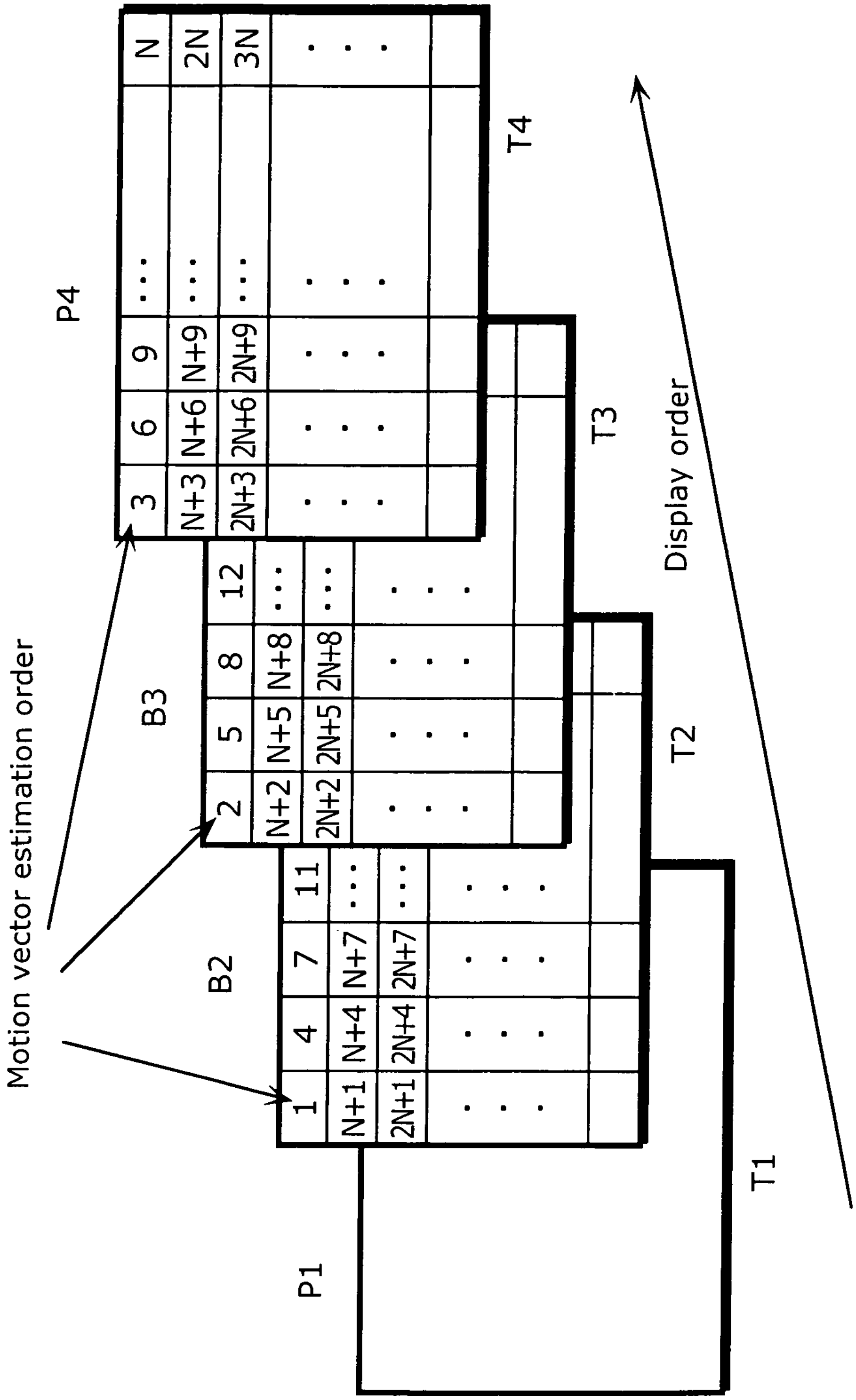
FIG. 10 is a figure which shows a motion vector estimation order in the embodiment of the present invention.

FIG. 10 is a figure which shows a motion vector estimation order. In FIG. 10, the estimation order of the motion vectors for each block is indicated by numbers inside each block (1, 2, . . . , N, N+1, . . . ). More specifically, the motion vector estimation apparatus 100*a* first estimates a motion vector for the upper left corner block in the picture B2, and using the motion vector, estimates a motion vector for the upper left corner block of the picture B3 and subsequently estimates a motion vector for the upper left corner block in the picture P4. Next, upon estimating a motion vector for the second block to the right from the upper left corner of the picture B2, the motion vector estimation apparatus 100*a* uses the motion vector to estimate a motion vector for the second block to the right from the upper left corner of the picture B3. In this way, the motion vector estimation apparatus 100*a* estimates the motion vector for the target block in the order: picture B2, picture B3 and picture P4, while shifting the target block to the right in each picture.

Next, when the motion vectors for all of the blocks in the highest row have been estimated, the motion vector detection apparatus 100*a* estimates the motion vector for each block, as a target block, in a row below the highest row, in the order described above. The motion vector estimation apparatus 100*a* estimates motion vectors for every block which is targeted for motion vector estimation, shifting from left to right, top to bottom in the order: picture B2, picture B3 and picture P4. As a result, forward motion vectors relative to the reference picture P1 are estimated for every block in picture B2 and picture B3, and motion vectors are estimated relative to the reference picture P1 for every block in the picture P4.

Thus, when all the motion vectors are estimated relative to the reference picture P1 for a target block in the picture P4, the motion compensation unit 126 performs motion compensation using the estimated motion vector as well as the reference picture P1, generating a predicted image for every block in the picture P4. Subsequently, the difference computation unit 113, the coding unit 115, the decoding unit 118 and the addition computation unit 119 generate restructured pictures through a coded signal from the predicted image and store the restructured picture in the picture memory 120. As a result, after motion vectors for all of the blocks in the picture P4 are estimated, the picture P4 is stored in the picture memory 120 as a reference picture.

In this way, upon estimating a motion vector for a block included in the target picture, the motion vector detection apparatus 100*a* in the present embodiment estimates motion vectors in an order according to the display order to, for example, estimate the motion vector for a block included in the next target picture in the display order. The motion vector detection apparatus 100*a* of the present embodiment does not estimate motion vectors in an order which does not follow the display order, as in the conventional method wherein: after motion vectors for all the blocks in a P picture are estimated, motion vectors for all the blocks in a B picture which precedes the P picture in the display order are estimated.

Next, the motion vector estimation apparatus 100*a* estimates backward motion vectors for the picture B2 and the picture B3. As above, the motion vector estimation apparatus 100*a* calculates a backward prediction motion vector for every target block in the picture B2 and the picture B3 using the temporal direct mode, and estimates a backward motion vector within a search range centered on a position indicated by the prediction motion vector.

Figure 11:
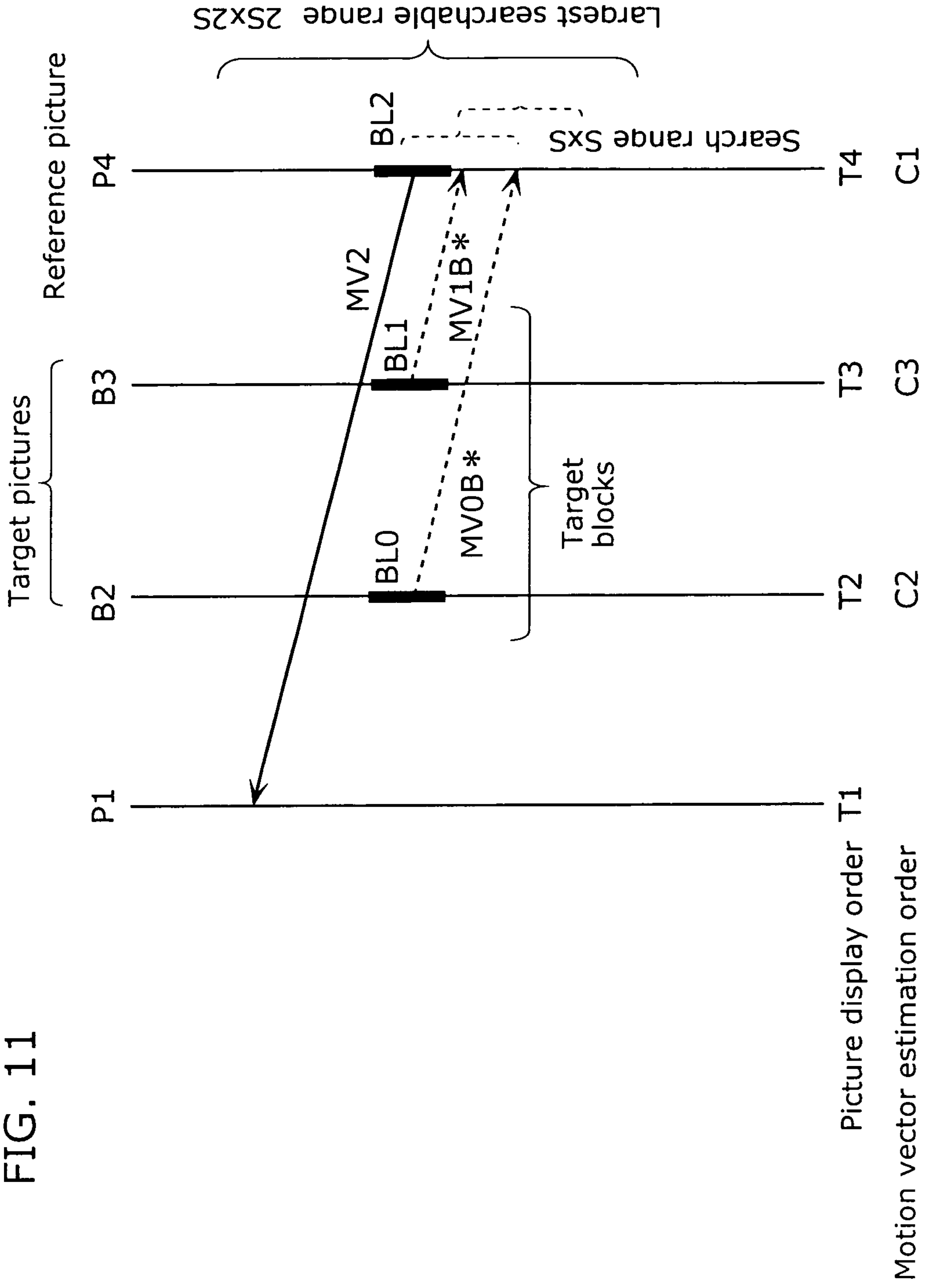
FIG. 11 is an explanatory diagram for describing a backward prediction motion vector calculated by the prediction computation unit in the embodiment of the present invention.

FIG. 11 is an explanatory diagram for describing a backward prediction motion vector calculated by the prediction computation unit 123 in the present embodiment.

In order to calculate a backward prediction motion vector for the target block BL0 and the target block BL1, which are co-located with each other in the picture B2 and in the picture B3 respectively, the prediction computation unit 123 reads out, from the storage unit 122, a motion vector MV2 for the block BL2 in the reference picture P4, which is co-located with the target blocks BL0 and BL1. Subsequently, the prediction computation unit 123 calculates a prediction motion vector MV0B* and a prediction motion vector MV1B* for the target blocks BL0 and BL1, by scaling the motion vector MV2.

More specifically, the prediction computation unit 123 uses the display order information T1, T2, T3 and T4 for the pictures P1, B2, B3 and P4 to calculate the prediction motion vector MV0B* for the target block BL0 in the picture B2, relative to the reference picture P4, as well as the prediction motion vector MV1B* for the target block BL1 in the picture B3, relative to the reference picture P4, using the (Equation 3a) and the (Equation 3b) below. Note that in the (Equation 3a) and the (Equation 3b), Mv0*b** and Mv1*b** indicate the size of the prediction motion vector MV0B* and MV1B* respectively, and Mv2 indicates the size of the motion vector MV2.

$$Mv0b^{*}=(T2-T4)/(T4-T1)\times Mv2 \quad \text{(Equation 3a)}$$

$$Mv1b^{*}=(T3-T4)/(T4-T1)\times Mv2 \quad \text{(Equation 3b)}$$

Thus, when the display time interval for each picture P1, B2, B3 and P4 is equidistant, a range of (2×S) pixels by (2×S) lines becomes the largest searchable range in the reference picture P4.

The prediction computation unit 123 outputs the prediction motion vectors MV0B* and MV1B* calculated in this way to the search range control unit 124.

The search range control unit 124 defines the search range, indicated by the prediction motion vector MV0B* in the reference picture P4, in the motion vector detection unit 121. In other words, the search range control unit 124 defines a search range of S pixels by S lines centered on a position in the reference picture P4 indicated by the prediction motion vector MV0B*. The search range control unit 124 defines a search range, which is indicated by the prediction motion vector MV1B* in the reference picture P4, in the motion vector estimation unit 121. More specifically, the search range control unit 124 defines a search range of S pixels by S lines centered on a position in the reference picture P4 indicated by the prediction motion vector MV1B*.

The motion vector estimation unit 121 estimates a backward motion vector for the target block BL0 and a backward motion vector for the target block BL1 within the search range in the reference picture P4 defined by the search range control unit 124. In other words, after estimating the motion vector MV2 for the block BL2 in the picture P4, the motion vector estimation unit 121 estimates a backward motion vector for the target block BL0 relative to the reference picture P4 and next estimates a backward motion vector for the target block BL1 relative to the reference picture P4. Subsequently, the motion vector estimation unit 121 respectively stores backward motion vectors for the target block BL0 and the target block BL1.

The motion vector estimation apparatus 100*a* estimates a backward motion vector for every block included in the picture B2 and the picture B3 in order from the upper left corner block, shifting target blocks from left to right and top to bottom.

Figure 12:
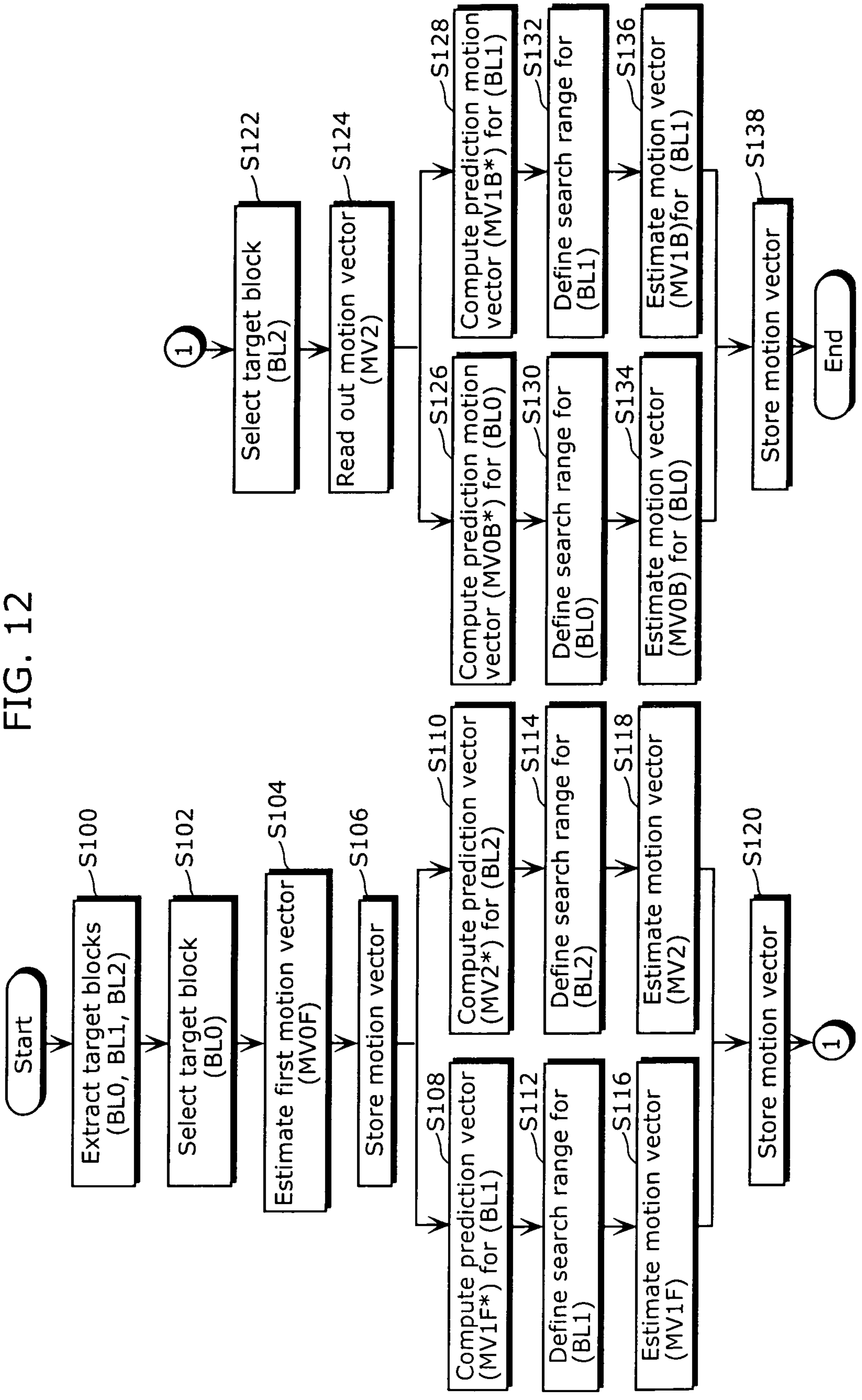
FIG. 12 is a flowchart which shows operations in which the motion vector estimation apparatus in the embodiment of the present invention estimates a motion vector.

FIG. 12 is a flowchart which shows operations in which the motion vector estimation apparatus 100*a* in the present embodiment estimates motion vectors.

First, the block selection unit 111 in the motion vector estimation apparatus 100*a* extracts a target block from the picture memory 112 (Step S100). For example, the block selection unit 111 extracts the blocks BL0, BL1 and BL2 from the target pictures B2, B3 and B4 respectively as shown in FIG. 9. Subsequently, the block selection unit 111 selects a block to be processed first from among the target blocks, for example the block BL0 (Step S102).

The motion vector estimation unit 121 estimates the motion vector (forward motion vector) MV0F relative to the reference picture P1 for the target block BL0, which is selected by the block selection unit 111 (Step S104). Next, the motion vector estimation unit 121 stores the estimated motion vector MV0F in the storage unit 122 (Step S106).

The prediction computation unit 123 computes (calculates) the forward prediction motion vector MV1F* for the target block BL1 relative to the reference picture P1 by using the temporal direct mode, i.e. by scaling the motion vector MV0F estimated by the motion vector estimation unit 121 (Step S108). In the same way, the prediction computation unit 123 computes (calculates) the prediction motion vector MV2* for the target block BL2 relative to the reference picture P1 by scaling the motion vector MV0F estimated by the motion vector estimation unit 121 (Step S110).

The search range control unit 124 specifies a search range in the reference picture P1, which is indicated by the prediction motion vector MV1F for the target block BL1, the prediction motion vector MV1F being calculated by the prediction computation unit 123 in order to define the search range in the motion vector estimation unit 121 (Step S112). In the same way, the search range control unit 124 specifies a search range in the reference picture P1 which is indicated by the prediction motion vector MV2* for the target block BL2 and calculated by the prediction computation unit 123, in order to define the search range in the motion vector estimation unit 121 (Step S114).

The motion vector estimation unit 121 estimates a motion vector (forward motion vector) MV1F for the target block BL1 by searching for a block with an image similar to the target block BL1 within the search range defined by the search range control unit 124 for the target block BL1 (Step S116). In the same way, the motion vector estimation unit 121 estimates the motion vector MV2 for the target block BL2 by searching for a block with an image that is similar to the target block BL2 within the search range defined by the search range control unit 124 for the target block BL2 (Step S118). Next, the motion vector estimation unit 121 stores the estimated motion vector MV1F and the motion vector MV2 in the storage unit 122 (Step S120).

The forward motion vectors for all of the target blocks BL0, BL1 and BL2 extracted by the block selection unit 111 are estimated by the processes from Step S100 to S120.

Next, the block selection unit 111 again extracts the target blocks. For example, the block selection unit 111 respectively extracts the blocks BL0 and BL1 as target blocks from the target pictures B2 and B3 in the picture memory 112, as shown in FIG. 11. Subsequently, the block selection unit 111 selects the block BL2 in the reference picture P4, which is co-located with the target blocks BL0 and BL1.

The prediction computation unit 123 reads out, from the storage unit 122, the motion vector MV2 for the block BL2 in the reference picture P4, which is selected by the block selection unit 111 (Step S124). Subsequently, the prediction computation unit 123 computes (calculates) a backward prediction motion vector MV0B* for the target block BL0 relative to the reference picture P4, by using the temporal direct mode, i.e. by scaling the motion vector MV2 read out from the storage unit 122 (Step S126). In the same way, the prediction computation unit 123 computes (calculates) the backward prediction motion vector MV1B* for the target block BL1, relative to the reference picture P4, by scaling the motion vector MV2 read out from the storage unit 122 (Step S128).

The search range control unit 124 specifies the search range in the reference picture P4 indicated by the prediction motion vector MV0B* for the target block BL0 and calculated by the prediction computation unit 123 and defines the search range for the motion vector estimation unit 121 (Step S130). In the same way, the search range control unit 124 specifies the search range in the reference picture P4 indicated by the prediction motion vector MV1B* for the target block BL1 and calculated by the prediction computation unit 123, and defines the search range in the motion vector estimation unit 121 (Step S132).

The motion vector estimation unit 121 estimates a motion vector (backward motion vector) MV0B for the target block BL0 by searching for a block with an image similar to that of the target block BL0 within the search range defined by the search range control unit 124 for the target block BL0 (Step S134). In the same way, the motion vector estimation unit 121 estimates a motion vector (backward motion vector) MV1B for the target block BL1 by searching for a block with an image similar to the target block BL1 within the search range defined by the search range control unit 124 for the target block BL1 (Step S136). Next, the motion vector estimation unit 121 stores the estimated motion vector MV0B and the estimated motion vector MV1B in the storage unit 122 (Step S138).

The backward motion vectors for all of the target blocks BL0 and BL1 extracted by the block selection unit 111 are estimated in the processes from Step S122 to S138.

In this way, in the motion vector estimation apparatus 100*a* in the present embodiment, in order to estimate a motion vector for a target block in a target picture, the motion vector estimation apparatus 100*a* scales a motion vector estimated for a target block in another target picture, calculates a prediction motion vector, and specifies a range of S pixels by S lines as a search range in the reference picture indicated by the prediction motion vector. Accordingly, a search range of fixed size is always specified regardless of time difference in the display time between the target picture and the reference picture. On the other hand, conventionally, when the target picture differs from the reference picture in terms of display time, the search range is taken to be a wide range according to the time difference. Accordingly, in the present embodiment, even when the target picture differs from the reference picture in terms of display time, it is possible to shrink the search region and specify an appropriate search region by scaling the motion vector MV0F.

Also, in the present embodiment, since there is no need to seek a motion vector between adjacent pictures, drops in estimation accuracy for motion vectors, such as in a telescopic search, can be prevented. Further, in the present embodiment, it is not necessary to directly detect unnecessary motion vectors, as in the telescopic search. As a result, the search range can be reduced as a whole. Further, in the present embodiment, when estimating a motion vector for each target block while shifting target blocks, it is possible to reduce the transferred data load from the picture memory 120 which stores the reference picture, in comparison to a telescopic search. More specifically, in the present embodiment, even if there is another picture in the display order between a reference picture and a target picture, there is no need to read out data in the search range of the other picture from the picture memory 120, and further, when estimating motion vectors for each target block and shifting the target block, it is possible to effectively use the search range that has been read out to reduce the amount of data newly read out from the picture memory 120.

As a result, in the motion vector estimation apparatus 100*a* in the present embodiment, the computation load for estimating the motion vector can be reduced since an appropriate search range can be chosen as the search range, and circuit size can be decreased since the amount of transferred data from the picture memory 120 can be reduced.

When a motion vector for the target block as above is estimated, the mode selection unit 125 uses the estimated motion vector and the prediction motion vector calculated by the prediction computation unit 123 to select either temporal direct mode or non-temporal direct mode. More specifically, upon performing this kind of selection, the mode selection unit 125 uses the prediction residual image, the motion vector and the prediction motion vector, the position information of the target block and the display order of the target pictures to calculate an evaluation value in the temporal direct mode and an evaluation value in the non-temporal direct mode. Thus, the mode selection unit 125 selects a mode based on the comparison results of the evaluation value.

Figure 13:
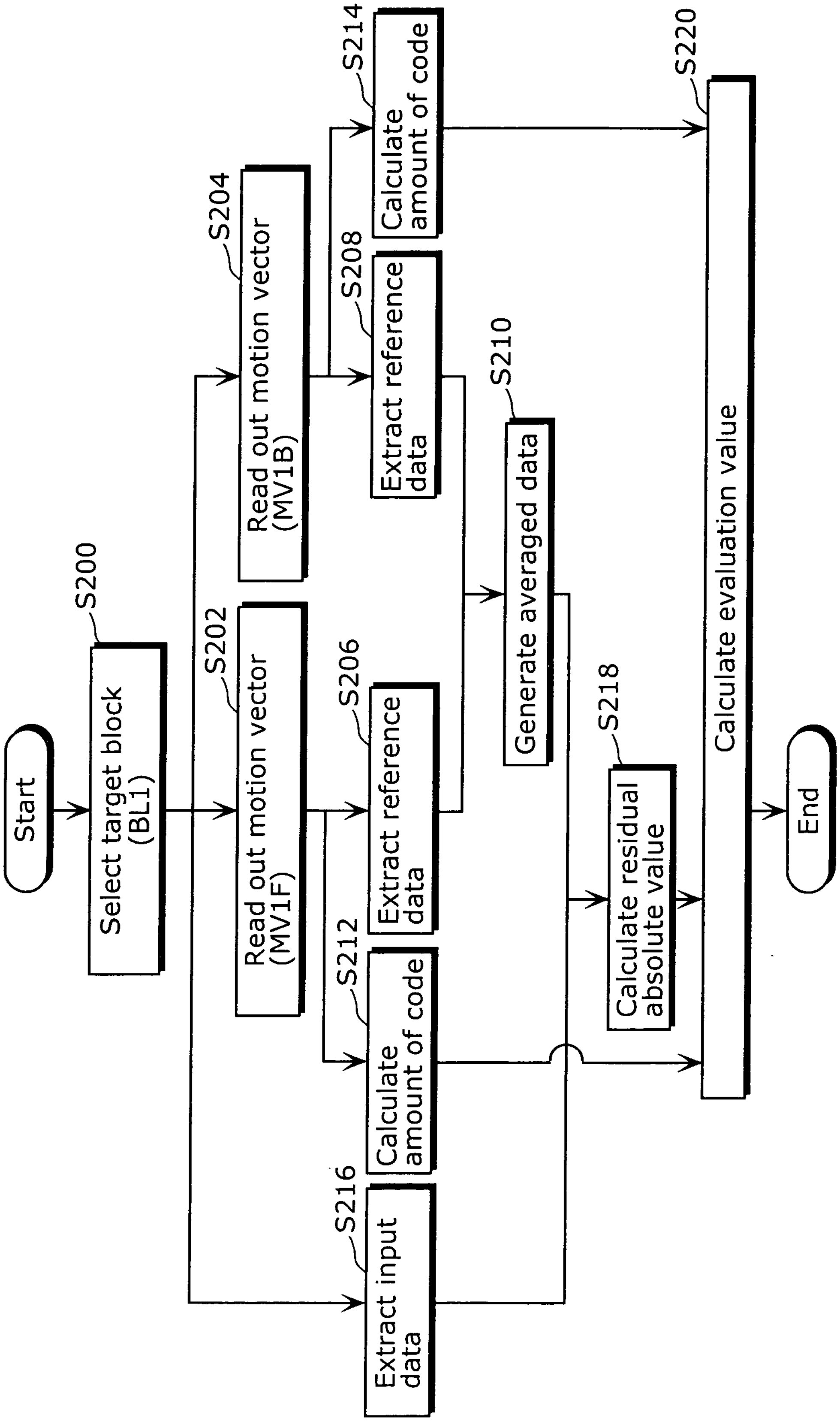
FIG. 13 is a flowchart which shows operations in which the mode selection unit calculates an evaluation value in a non-temporal direct mode.

FIG. 13 is a flowchart which shows operations in which the mode selection unit 125 calculates an evaluation value in the non-temporal direct mode.

First, the mode selection unit 125 selects a target block (Step S200). For example, the mode selection unit 125 selects the block BL1 in the picture B3 shown in FIG. 9 and FIG. 11. The mode selection unit 125 reads out, from the storage unit 122, the forward motion vector MV1F and the backward motion vector MV1B for the block BL1 (Step S202, S204).

Subsequently, the mode selection unit 125 makes the motion compensation unit 126 extract a block in the reference picture P1, indicated by the forward motion vector MV1F, as reference data (Step S206) and extract a block in the reference picture P4 that is indicated by the backward motion vector MV1B, as reference data (Step S208). Further, the mode selection unit 125 makes the motion compensation unit 126 calculate an average of the reference data for the reference picture P1 and the reference data for the reference picture P4, and generate averaged reference data (Step S210).

The mode selection unit 125 makes the coded stream generation unit 117 calculate an amount of code for the forward motion vector MV1F which is read out in Step S202 (Step S212) and makes the coded stream generation unit 117 calculate an amount of code for the backward motion vector MV1B read out in Step S204 (Step S214).

The mode selection unit 125 extracts the block BL1 selected in Step S200 as input data from the picture memory 112, via the block selection unit 111 (Step S216). Subsequently, the mode selection unit 125 calculates a sum of absolute value differences between the averaged reference data generated in Step S210 and the input data extracted in Step S216 (Step S218).

The mode selection unit 125 calculates an evaluation value in the non-temporal direct mode based on the sum of absolute value differences calculated in Step S218 and the amount of code calculated in Step S212 and S214 (Step S220).

Figure 14:
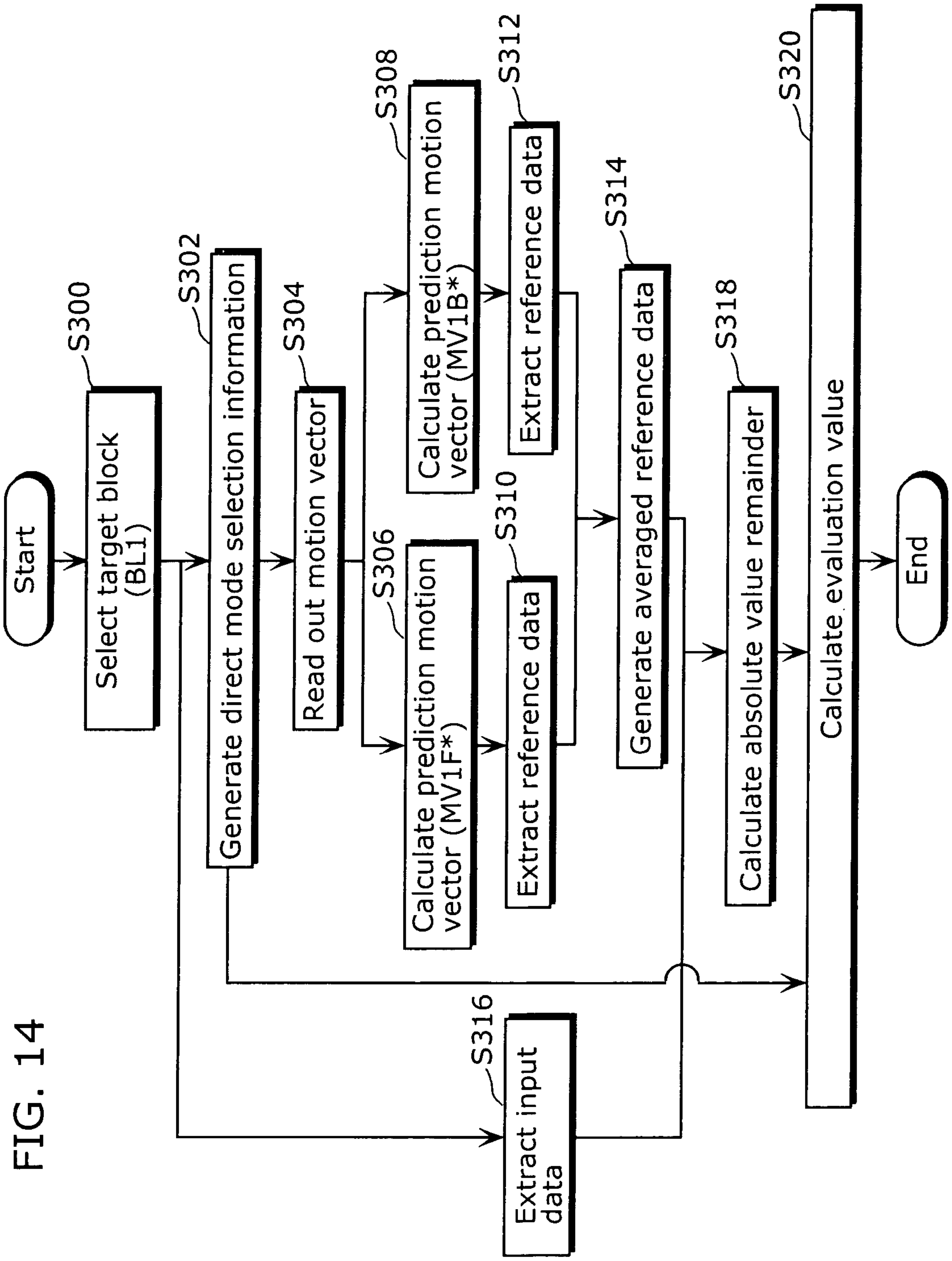
FIG. 14 is a flowchart which shows operations in which the mode selection unit calculates an evaluation value in the temporal direct mode.

FIG. 14 is a flowchart which shows operations in which the mode selection unit 125 calculates an evaluation value in the temporal direct mode.

First, the mode selection unit 125 selects a target block (Step S300). For example, the mode selection unit 125 selects a block BL1 for the picture B3 shown in FIG. 9 and FIG. 11. Next, the mode selection unit 125 generates direct mode selection information for issuing notification that the temporal direct mode has been selected (Step S302).

Next, the mode selection unit 125 reads out, from the storage unit 122, the motion vector needed in the temporal direct mode, such as the motion vector MV2 (Step S304). Subsequently, the mode selection unit 125 makes the prediction computation unit 123 calculate a prediction motion vector (Step S306, S308). The prediction computation unit 123, for example, calculates a forward prediction motion vector MV1F* and a backward prediction motion vector MV1B* for the block BL1 selected in Step S300, by scaling the motion vector read out in Step S304.

Subsequently, the mode selection unit 125 makes the motion compensation unit 126 extract a block in the reference picture P1, indicated by the forward prediction motion vector MV1F* (Step S310) and extract a block in the reference picture P4, indicated by the backward prediction motion vector MV1B* (Step S312) as reference data. Further, the mode selection unit 125 makes the motion compensation unit 126 calculate an average of reference data in the reference picture P1 and reference data in the reference picture P4 to generate averaged reference data (Step S314).

The mode selection unit 125 extracts the block BL1, selected in Step S300, as input data from the picture memory 112 via the block selection unit 111 (Step S316). Next, the mode selection unit 125 calculates an absolute value difference between the averaged reference data generated in Step S314 and the input data extracted in Step S316 (Step S318).

The mode selection unit 125 calculates an evaluation value in the temporal direct mode based on the absolute value difference calculated in Step S318 and the direct mode selection information generated in Step S302 (Step S320).

In this way, upon calculating an evaluation value in the non-temporal direct mode and the temporal direct mode for the block BL1, the mode selection unit 125 selects the mode with the higher evaluation value and in which the total amount of code decreases, by comparing evaluation values.

Subsequently, when selecting the non-temporal direct mode, the mode selection unit 125 outputs, to the coded stream generation unit 117, a motion vector for the target block estimated by the motion vector estimation unit 121 and stored in the storage unit 122. As a result, the coded stream generation unit 117 performs variable length coding on the motion vector and includes it in the coded stream. However, when selecting the temporal direct mode, the mode selection unit 125 outputs direct mode selection information to the coded stream generation unit 117. As a result, the coded stream generation unit 117 includes the direct mode selection information in the coded stream.

In this way, in the present embodiment, it is always possible to reduce the amount of code in a coded stream by switching between temporal direct mode and non-temporal direct mode based on the evaluation value. Also, in the present embodiment, since the estimation accuracy for the motion vector is high compared to a telescopic search, it is likely that temporal direct mode will be chosen and the amount of code will reduce.

(Modification 1)

Here, the prediction motion vector estimation method in the present embodiment is described for a first modification.

In the embodiment above, a motion vector for a target block included in the earliest picture among plural pictures in the display sequence is scaled. In other words, as shown in FIG. 9, the motion vector estimation apparatus 100*a* estimates the motion vector MV0F for the target block BL0 included in the earliest picture B2 in the display sequence, and scales the motion vector MV0F. As a result, the motion vector estimation apparatus 100*a* calculates the forward prediction motion vector MV1F* for the target block BL1, which is included in the picture B3, and the forward prediction motion vector MV2* for the target block BL2, which is included in the picture P4.

In the present modification, by scaling a motion vector for a target block in a picture midway through the display order, among plural pictures, the prediction motion vectors for each target block included in a picture before or after the picture midway through the display order are calculated.

Figure 15:
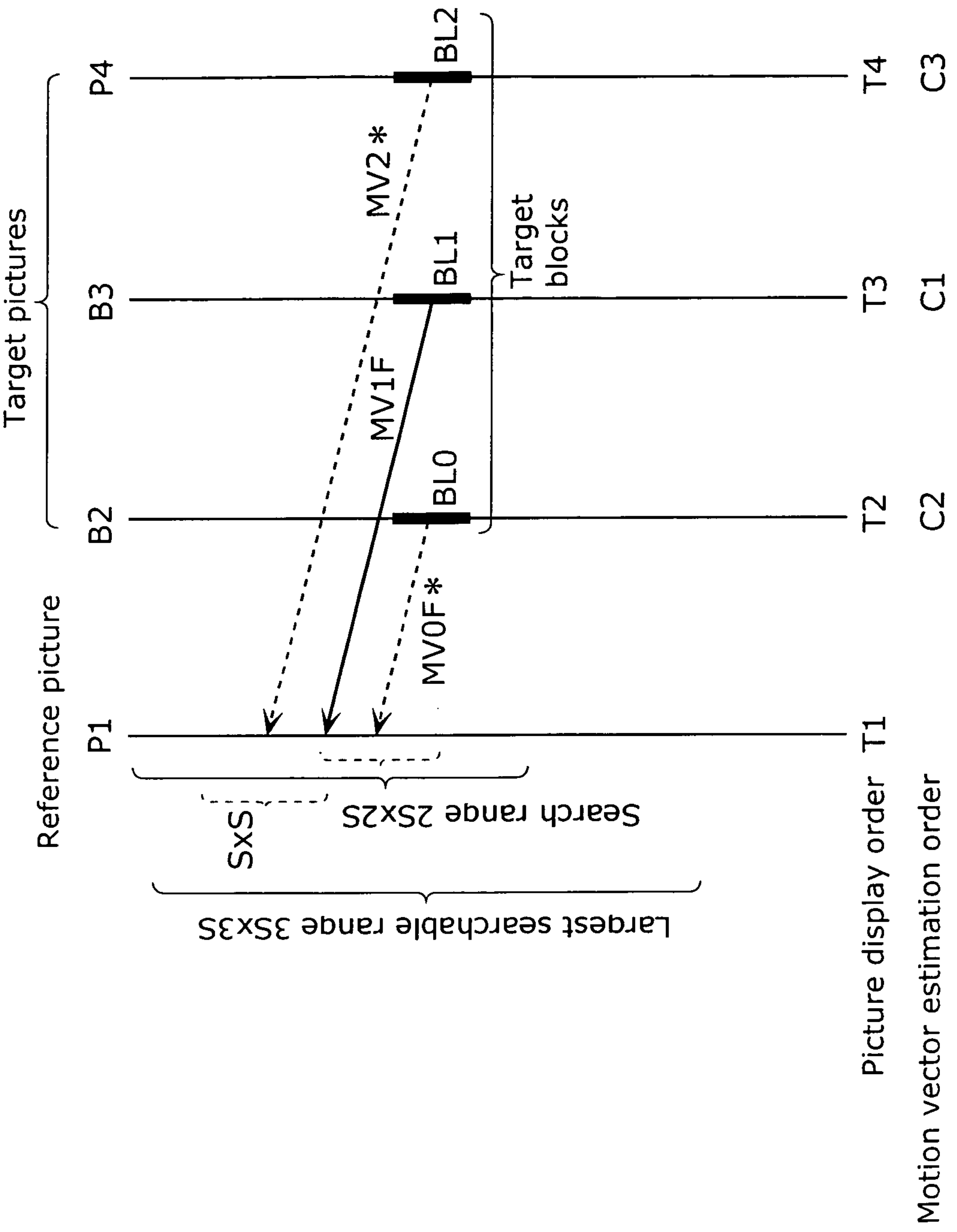
FIG. 15 is a figure which shows a prediction motion vector calculation method in a first modification of the present invention.

FIG. 15 is a diagram which shows a prediction motion vector calculation method in the first modification.

First, the motion vector estimation unit 121 estimates the motion vector MV1F for the target block BL1 included in the picture B3; the picture B3 being midway through the display sequence among the target pictures. Next, the motion vector estimation unit 121 stores the motion vector MV1F in the storage unit 122.

Here, for example, the search range for the motion vector for the block in the picture B2, relative to the reference picture P1, is S pixels by S lines, and the display time interval between the reference picture P1 and the picture B3 is twice the display time interval between the reference picture P1 and the picture B2. In this case, the search range in the reference picture P1 for estimating the motion vector MV1F for the target block BL1 is (2×S) pixels×(2×S) lines.

The prediction computation unit 123 reads out the motion vector MV1F from the storage unit 122 and calculates a prediction motion vector MV0F* and the prediction motion vector MV2* relative to the target blocks BL0 and BL2, which are co-located with the target block BL1 in the picture B2 and the picture P4, by scaling the motion vector MV1F.

More specifically, by using (Equation 4a) and (Equation 4b) below as well as the display order information T1, T2, T3 and T4 for the pictures P1, B2, B3 and P4, the prediction computation unit 123 calculates the prediction motion vector MV0F* relative to the reference picture P1 for the target block BL0 in the picture B2, as well as the prediction motion vector MV2 relative to the reference picture P1 for the target block BL2 in the picture P4. Note that in the (Equation 4a) and the (Equation 4b), Mv0*f and Mv2* indicate the size of the prediction motion vectors MV0**F* and MV2* respectively, and Mv1F indicates the size of the motion vector MV1F.

$$Mv0f^* = (T2 - T1)/(T3 - T1) \times Mv1F \quad \text{(Equation 4a)}$$

$$Mv2^* = (T4 - T1)/(T3 - T1) \times Mv1F \quad \text{(Equation 4b)}$$

Upon specifying a search range of S pixels by S lines centered on a position in the reference picture P1 indicated by the prediction motion vector MV0F*, the search range control unit 124 defines this search range into the motion vector estimation unit 121 and; upon specifying a search range of S pixels by S lines centered on the position in the reference picture P1 indicated by the prediction motion vector MV2*, the search range control unit 124 defines this search range into the motion vector estimation unit 121.

The motion vector estimation unit 121 estimates a forward motion vector for the target block BL0 and a motion vector for the target block BL2 within the search range in the reference picture P1, which is defined by the search range control unit 124. In other words, after estimating the forward motion vector for the target block BL1 relative to the reference picture P1, the motion vector estimation unit 121 estimates the forward motion vector for the target block BL0 relative to the reference picture P1 and then estimates the motion vector for the target block BL2 relative to the reference picture P1. Thus, the motion vector estimation unit 121 stores the motion vectors for the target block BL0 and the target block BL2 respectively in the storage unit 122.

In the modification as above, it is possible to calculate prediction motion vectors with a high accuracy for each target block included in pictures before and after a picture in the middle of the display sequence by scaling the motion vector for the target block in the picture.

(Modification 2)

Below, a prediction motion vector calculation method in the present embodiment is described for a second modification.

In the embodiment above, a motion vector for a target block included in the earliest picture, among plural target pictures, in the display order is scaled.

In the present modification, by scaling the motion vector for a target block in the latest picture in the display order, among plural target pictures, the prediction motion vectors for each target block included in a target picture before the latest picture are calculated.

Figure 16:
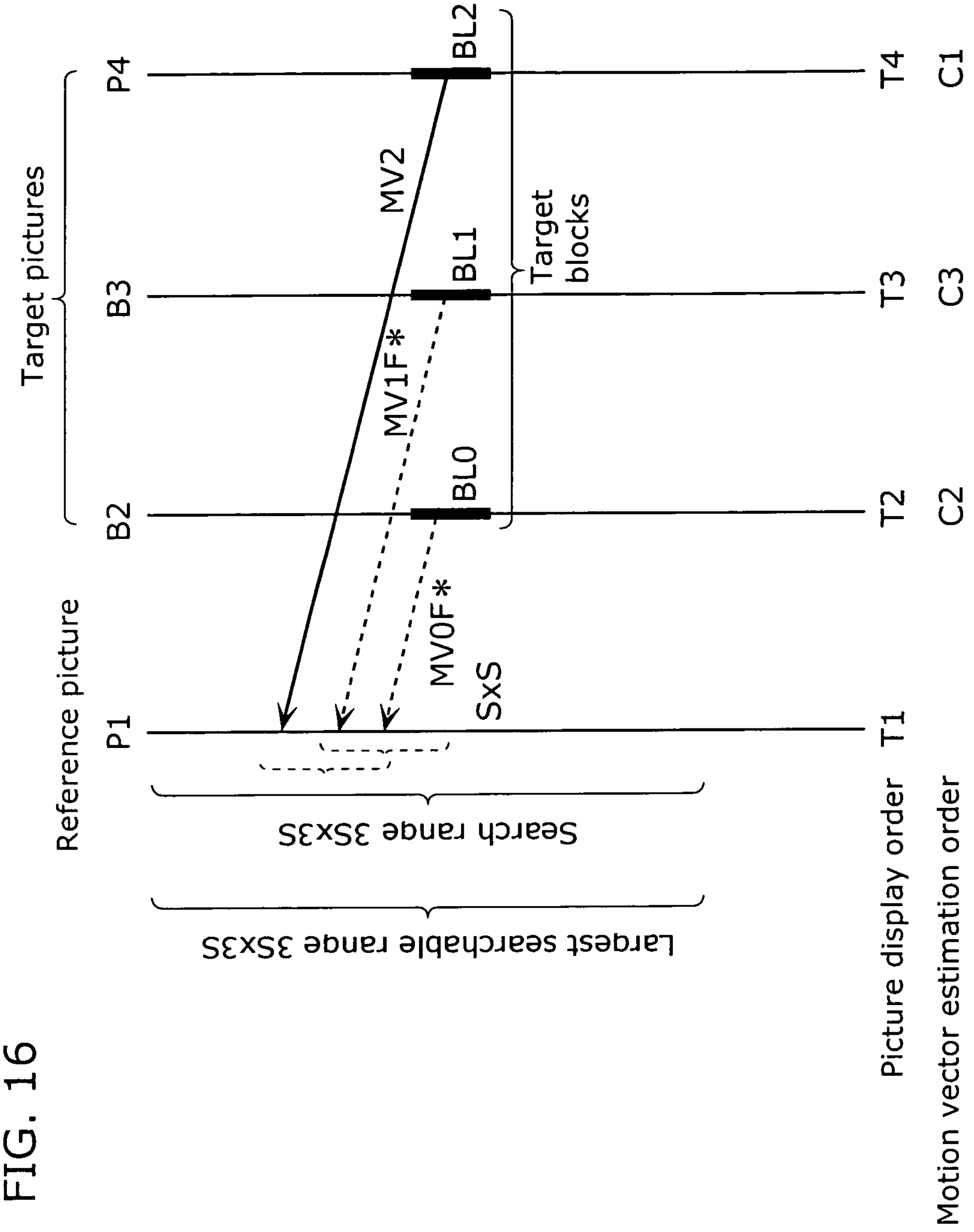
FIG. 16 is a figure which shows the prediction motion vector calculation method in a second modification of the present invention.

FIG. 16 is a diagram which shows the prediction motion vector calculation method in the second modification.

First, the motion vector estimation unit 121 estimates the motion vector MV2 for the target block BL2 included in the picture P4, the picture P4 being the latest picture, among plural target pictures, in the display sequence. Next, the motion vector estimation unit 121 stores the motion vector MV2 in the storage unit 122.

Here, for example, the search range for the motion vector for the block in the picture B2 relative to the reference picture P1 is S pixels by S lines, and the display time interval between the reference picture P1 and the picture P4 is three times the display time interval between the reference picture P1 and the picture B2. In this case, the search range in the reference picture P1, which is used for estimating a motion vector MV2 for the target block BL2 is (3×S) pixels by (3×S) lines.

The prediction computation unit 123 reads out the motion vector MV2 from the storage unit 122 and calculates the prediction motion vector MV0F* and the prediction motion vector MV1F* for the target blocks BL0 and BL1, which are co-located with the target block BL2 in the picture B2 and the picture B3, by scaling the motion vector MV2.

More specifically, by using the display order information T1, T2, T3 and T4 for the pictures P1, B2, B3 and P4, as well as an (Equation 5a) and an (Equation 5b) below, the prediction computation unit 123 calculates the prediction motion vector MV0F*, relative to the reference picture P1, for the target block BL0 in the picture B2 as well as the prediction motion vector MV1F* relative to the reference picture P1, for the target block BL1 in the picture B3, using the (Equation 5a) and the (Equation 5b) below. Note that in the (Equation 5a) and the (Equation 5b), Mv0*f** and Mv1*f** indicate the size of the prediction motion vectors MV0F*and MV1F* respectively, and Mv2 indicates the size of the motion vector MV2.

$$MV0F^*=(T2-T1)/(T4-T1)\times Mv2 \quad \text{(Equation 5a)}$$

$$Mv1f^*=(T3-T1)/(T4-T1)\times Mv2 \quad \text{(Equation 5b)}$$

The search range control unit 124 specifies a search range of S pixels by S lines centered on a position in the reference picture P1 indicated by the prediction motion vector MV0F* and defines the search range into the motion vector estimation unit 121; the search range control unit 124 also specifies a search range of S pixels by S lines centered on a position in the reference picture P1 indicated by the prediction motion vector MV1F* and defines the search range into the motion vector estimation unit 121.

The motion vector estimation unit 121 estimates a forward motion vector for the target block BL0 and a forward motion vector for the target block BL1 within the search range in the reference picture P1 defined by the search range control unit 124.

In other words, after estimating the motion vector MV2 for the target block BL2 relative to the reference picture P1, the motion vector estimation unit 121 estimates the forward motion vector for the target block BL0 relative to the reference picture P1 and then estimates the forward motion vector for the target block BL1 relative to the reference picture P1. Subsequently, the motion vector estimation unit 121 stores forward motion vectors for the target block BL0 and the target block BL1 respectively into the storage unit 122.

(Modification 3)

Below, the prediction motion vector detection method in the present embodiment is described for a third modification.

When calculating a backward prediction motion vector in the embodiment above, the motion vectors for the P picture are scaled. In other words, as shown in FIG. 11, the motion vector estimation apparatus 100*a* estimates the motion vector MV2 for the block BL2 that is included in the reference picture P4 which is a P picture, and scales the motion vector MV2. As a result, the motion vector estimation apparatus 100*a* calculates the backward prediction motion vector MV0B* for the target block BL0, which is included in the picture B2, as well as the backward prediction motion vector MV1B for the target block BL1, which is included in the picture B3.

In the present modification, when calculating the backward prediction motion vector, a backward prediction motion vector is calculated for a B picture, i.e. another target picture, by scaling a backward motion vector in the nearest B picture to the reference picture among the target pictures in the display sequence.

Figure 17:
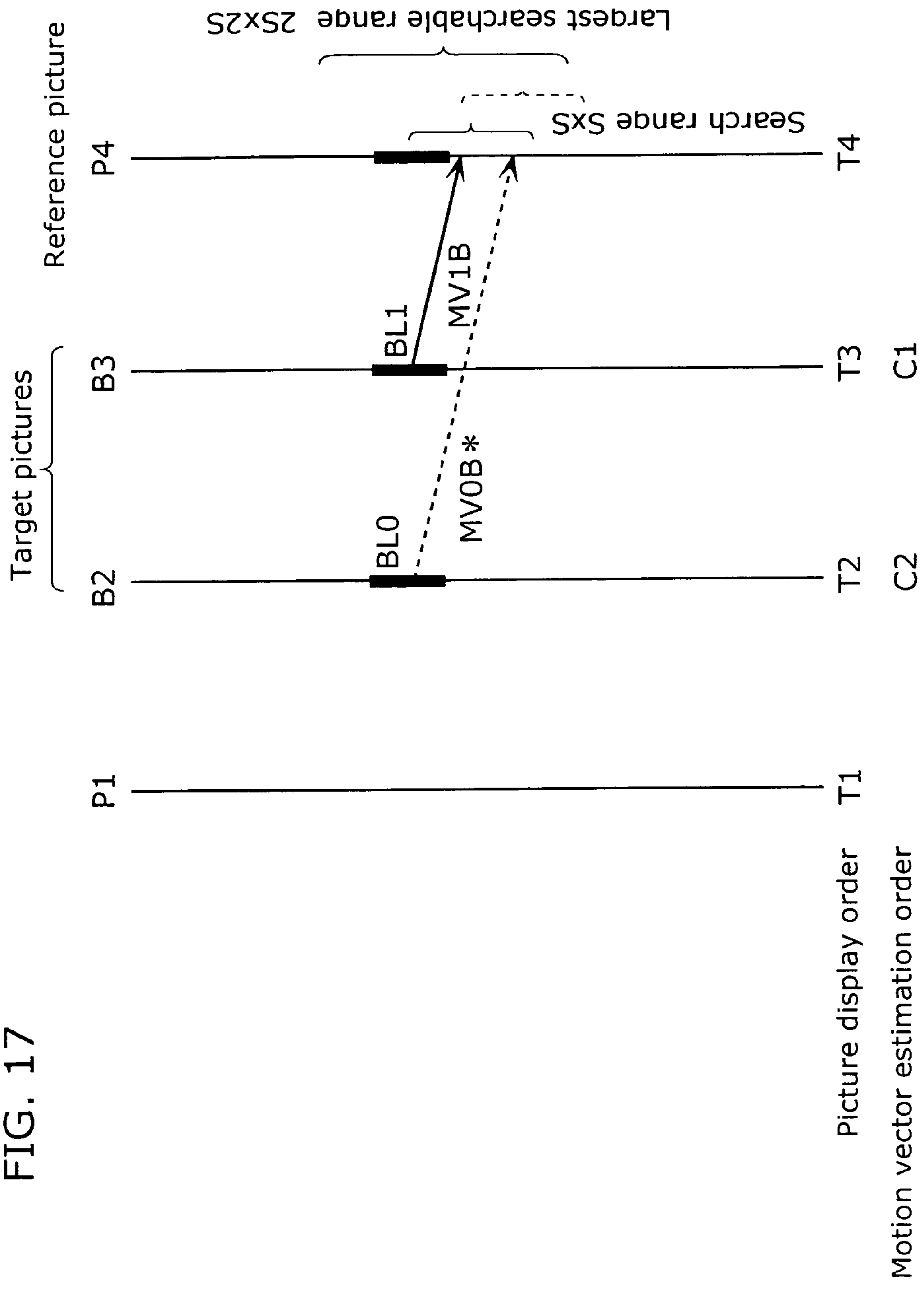
FIG. 17 is a figure which shows the prediction motion vector calculation method in a third modification of the present invention.

FIG. 17 is a diagram which shows the prediction motion vector calculation method in the third modification.

First, the motion vector estimation unit 121 estimates a motion vector (backward motion vector) MV1B for the targeted bloc BL1 included in picture B3, which is the nearest to the reference picture P4 among the target pictures. Next, the motion vector estimation unit 121 stores the motion vector MV1B in the storage unit 122.

The prediction computation unit 123 reads out the motion vector MV1B from the storage unit 122 and calculates the prediction motion vector MV0B* relative to the target block BL0, which is co-located with the target block BL1 in the picture B2, by scaling the motion vector MV1B.

More specifically, using the display order information T1, T2, T3 and T4 of the pictures P1, B2, B3 and P4 and (Equation 6) below, the prediction computation unit 123 calculates the prediction motion vector MV0B* relative to the reference picture P4 in the picture B2. Note that in the (Equation 6), Mv0*b** indicates the size of the prediction motion vector MV0B*, and Mv1B indicates the size of the motion vector MV1B.

$$Mv0b^*=(T4-T2)/(T4-T3)\times Mv1b \quad \text{(Equation 6)}$$

The search range control unit 124 specifies a search range of S pixels by S lines centered on the position in the reference picture P4 indicated by the prediction motion vector MV0B*, and defines the search range in the motion vector estimation unit 121.

The motion vector estimation unit 121 estimates a backward motion vector for the target block BL0 within the search range in the reference picture P4 defined by the search range control unit 124. In other words, after estimating a motion vector for the target block BL0 relative to the reference picture P1, the motion vector estimation unit 121 estimates the backward motion vector for the target block BL0 relative to the reference picture P4. Next, the motion vector estimation unit 121 stores the backward motion vector MV0B for the target block BL0 into the storage unit 122.

In this way, for the present modification, by scaling the backward motion vectors in the B picture nearest to the reference picture in the display sequence, the prediction motion vector for a target block included in another B picture next to the B picture may be calculated with great accuracy.

(Modification 4)

Below, the prediction motion vector calculation method in the present embodiment is described for a fourth modification.

In the embodiment above, when calculating a backward prediction motion vector, a motion vector for the P picture is scaled.

In the present modification, when calculating a backward prediction motion vector, the backward prediction motion vector for a B picture is calculated by scaling the backward motion vector for another B picture, which is the furthest from the reference picture among the target pictures in the display sequence.

Figure 18:
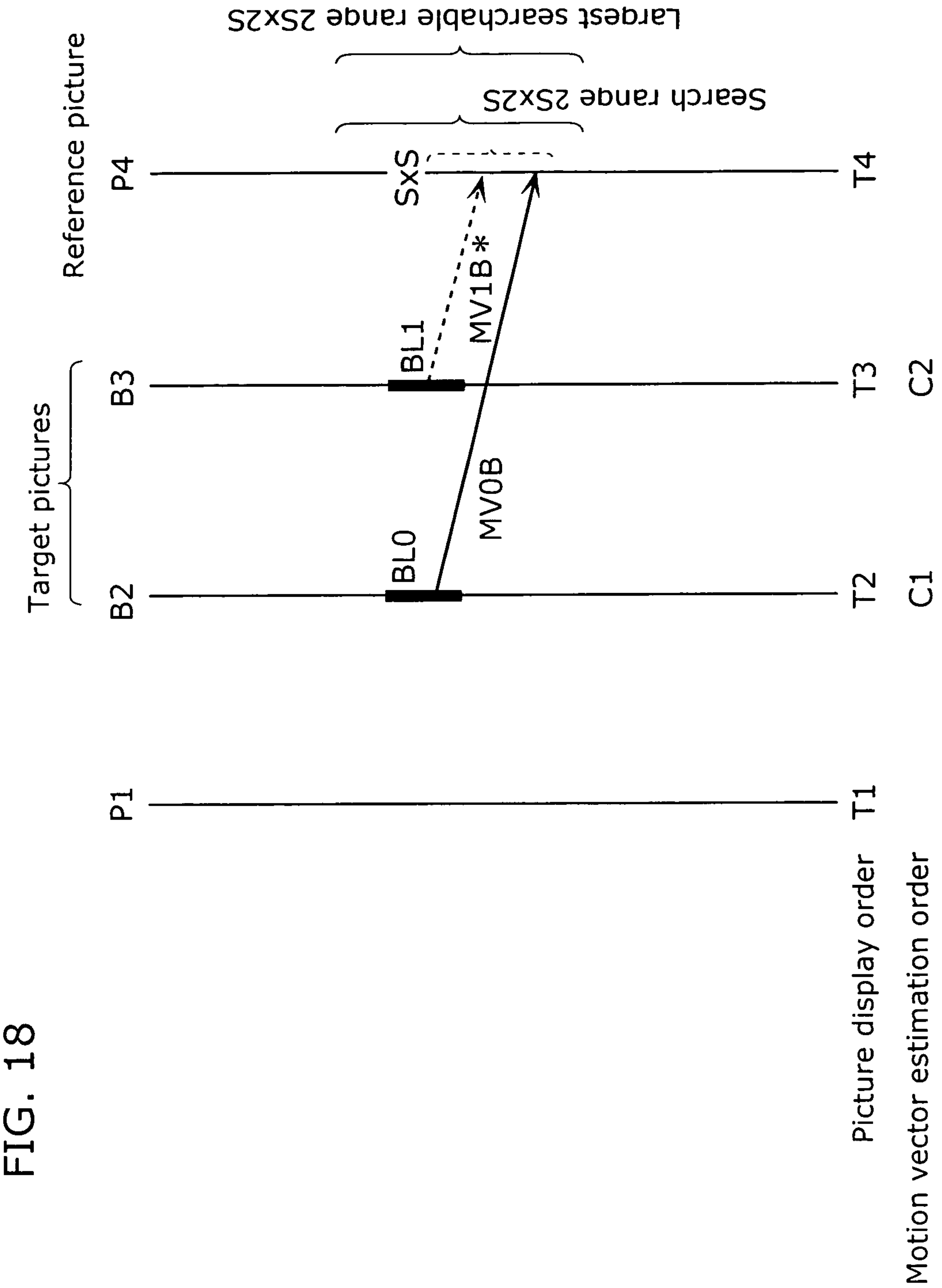
FIG. 18 is a figure which shows the prediction motion vector calculation method in a fourth modification of the present invention.

FIG. 18 is a figure which shows a prediction motion vector calculation method in the fourth modification.

First, the motion vector estimation unit 121 estimates the motion vector (backward motion vector) MV0B for the target block BL0 included in the picture B2, which is the furthest from the reference picture P4 among plural target pictures in the display sequence. Next, the motion vector estimation unit 121 stores the motion vector MV0B in the storage unit 122.

For example, the search range for the motion vector for a block in the picture B3, relative to the reference picture P4, is S pixels by S lines, and the display time interval between the reference picture P4 and the picture B2 is two times the display time interval between the reference picture p4 and the picture B3. In this case, the search range in the reference picture P4 for estimating the motion vector MV0B for the target block BL0 is (2×S) pixels by (2×S) lines.

The prediction computation unit 123 reads out the motion vector MV0B from the storage unit 122 and calculates the prediction motion vector MV1B* for the target block BL1, which is co-located with the target block BL0 in the picture B3, by scaling the motion vector MV0B.

More specifically, the prediction computation unit 123 uses the display order information T1, T2, T3 and T4 for the pictures P1, B2, B3 and P4 to calculate the prediction motion vector MV1B*, relative to the reference picture P4, for the target block BL1 in the picture B3 by (Equation 7) below. Note that in the (Equation 7), Mv1*b indicates the size of the prediction motion vector MV1**B* and Mv0*b* indicates the size of the motion vector MV0B.

$$Mv1b^* = (T4 - T3)/(T4 - T2) \times Mv0b \quad \text{(Equation 7)}$$

The search range control unit 124 specifies a search range of S pixels by S lines centered on a position in the reference picture P4 indicated by the prediction motion vector MV1B* and defines the search range in the motion vector estimation unit 121.

The motion vector estimation unit 121 estimates a backward motion vector for the target block BL1 within the search range in the reference picture P4, which is defined by the search range control unit 124. In other words, after estimating the backward motion vector for the target block BL0 relative to the reference picture P4, the motion vector estimation unit 121 estimates the backward motion vector for the target block BL1 relative to the reference picture P4. Subsequently, the motion vector estimation unit 121 stores the backward motion vector for the target block BL1.

(Modification 5)

Below, the prediction motion vector calculation method in the present embodiment is described for a fifth modification.

In the embodiment above, a motion vector is estimated for a picture among plural target pictures and by scaling the motion vector, another prediction motion vector for another target picture is calculated. In other words, as shown in FIG. 9, the motion vector estimation apparatus 100*a* estimates the motion vector MV0F for the target block BL0, which is included in the earliest picture B2 among the target pictures in the display order, and scales the motion vector MV0F. As a result, the motion vector estimation apparatus 100*a* calculates the forward prediction motion vector MV1F* for the target block BL1 included in the picture B3, and calculates the forward prediction motion vector MV2* for the target block BL2 included in the picture P4.

In the present modification, the motion vectors for plural target pictures are estimated and the motion vectors in the closest picture to the picture targeted for prediction motion vector calculation are scaled. In this way, the prediction motion vectors are calculated. In other words, in the present modification, a search range in the reference picture is specified based on a first motion vector in a picture with the shortest display time difference from the second picture among the plural first pictures.

Figure 19:
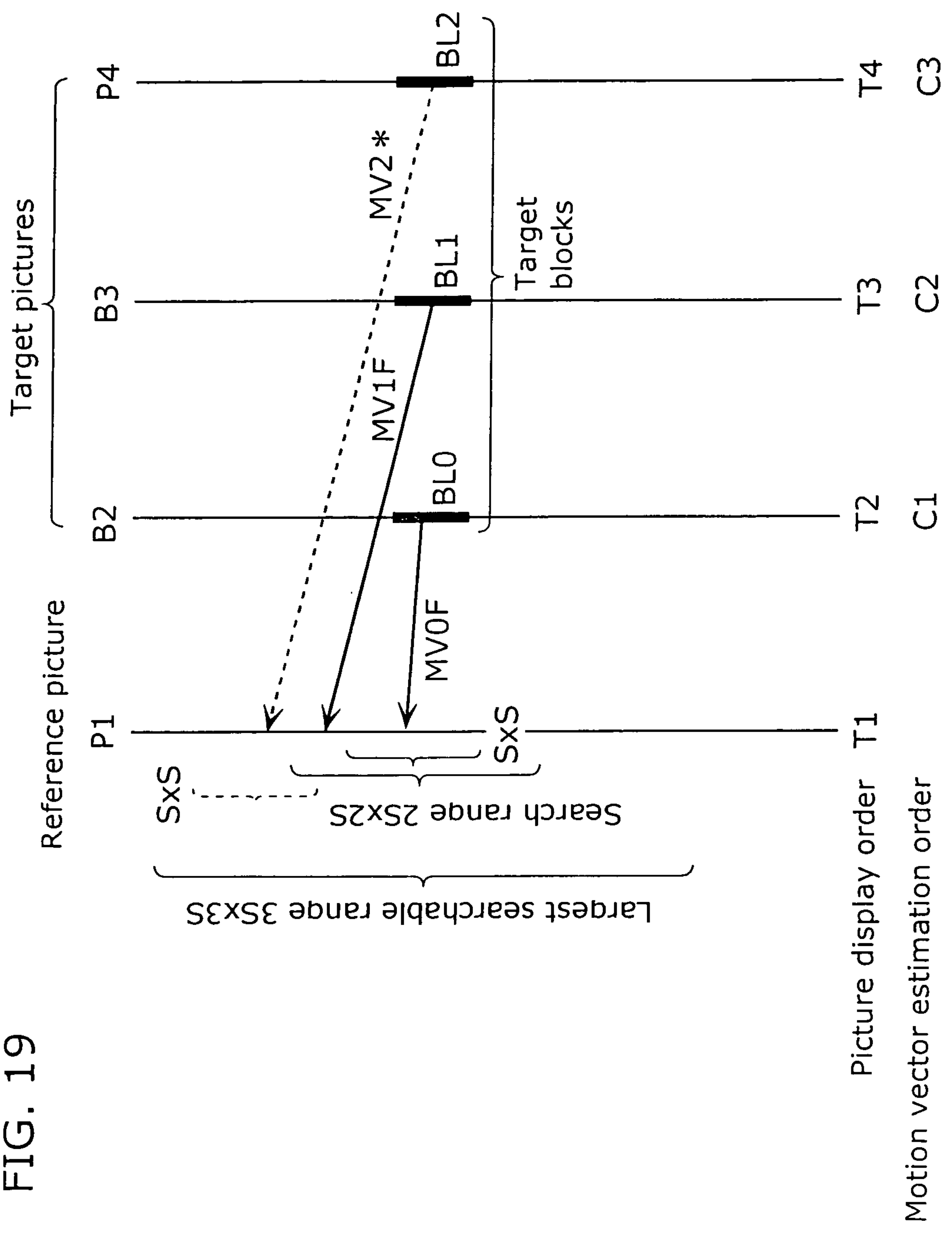
FIG. 19 is a figure which shows the prediction motion vector calculation method in a fifth modification of the present invention.

FIG. 19 is a figure which shows the prediction motion vector calculation method in the fifth modification. First, the motion vector estimation unit 121 estimates the motion vector (a forward motion vector) MV0F for the target block BL0 included in the picture B2, the picture B2 being the nearest picture to the reference picture P1, among the target pictures in the display order. Next, the motion vector estimation unit 121 stores the motion vector MV0F in the storage unit 122. The motion vector estimation unit 121 then estimates a motion vector (a forward motion vector) MV1F for the block BL1, which is included in the picture B3, the picture B3 being the closest picture after the picture B2 to the reference picture P1 among the target pictures in the display order. Next, the motion vector estimation unit 121 stores the motion vector MV1F in the storage unit 122.

Here, for example, the search range for the motion vector for a block of the picture B2, relative to the reference picture P1, is S pixels by S lines and the display time interval between the reference picture P1 and the picture B3 is two times the display time interval between the reference picture P1 and the picture B2. In this case, the search range in the reference picture P1, which is used for estimating the motion vector MV1F for the target block BL1 is (2×S) pixels by (2×S) lines.

The prediction computation unit 123 reads out the motion vector MV1F in the picture B3 from between the motion vector MV0F and the motion vector MV1F which are stored in the storage unit 122, the picture B3 being nearest to the picture P4. Subsequently, the prediction computation unit 123 calculates the prediction motion vector MV2* for the target block BL2, which is co-located with the target blocks BL0 and BL1 in the picture P4, by scaling the motion vector MV1F.

The search range control unit 124 specifies a search range of S pixels by S lines centered on a position in the reference picture P1 indicated by the prediction motion vector MV2* and defines the search range into the motion vector estimation unit 121.

The motion vector estimation unit 121 estimates a motion vector for the target block BL2 within the search range in the reference picture P1, which is defined by the search range control unit 124. In other words, after estimating the forward motion vector for the target block BL0 relative to the reference picture P1, the motion vector estimation unit 121 estimates a forward motion vector for the target block BL1 relative to the reference picture P1, and next estimates a motion vector for the target block BL2 relative to the reference picture P1. Next, the motion vector estimation unit 121 stores the motion vector for the target block BL2 in the storage unit 122.

(Modification 6)

Below, the prediction motion vector calculation method in the present embodiment is described for a sixth modification.

In the embodiment above, a motion vector for a picture from among a plurality of target pictures is estimated and the prediction motion vectors for another target picture are calculated by scaling the motion vectors.

In the present modification, motion vectors for a plurality of target pictures are estimated. Subsequently, when the motion vectors have a uniform orientation, the prediction motion vector for the other target picture is calculated by scaling one of the motion vectors.

Figure 20:
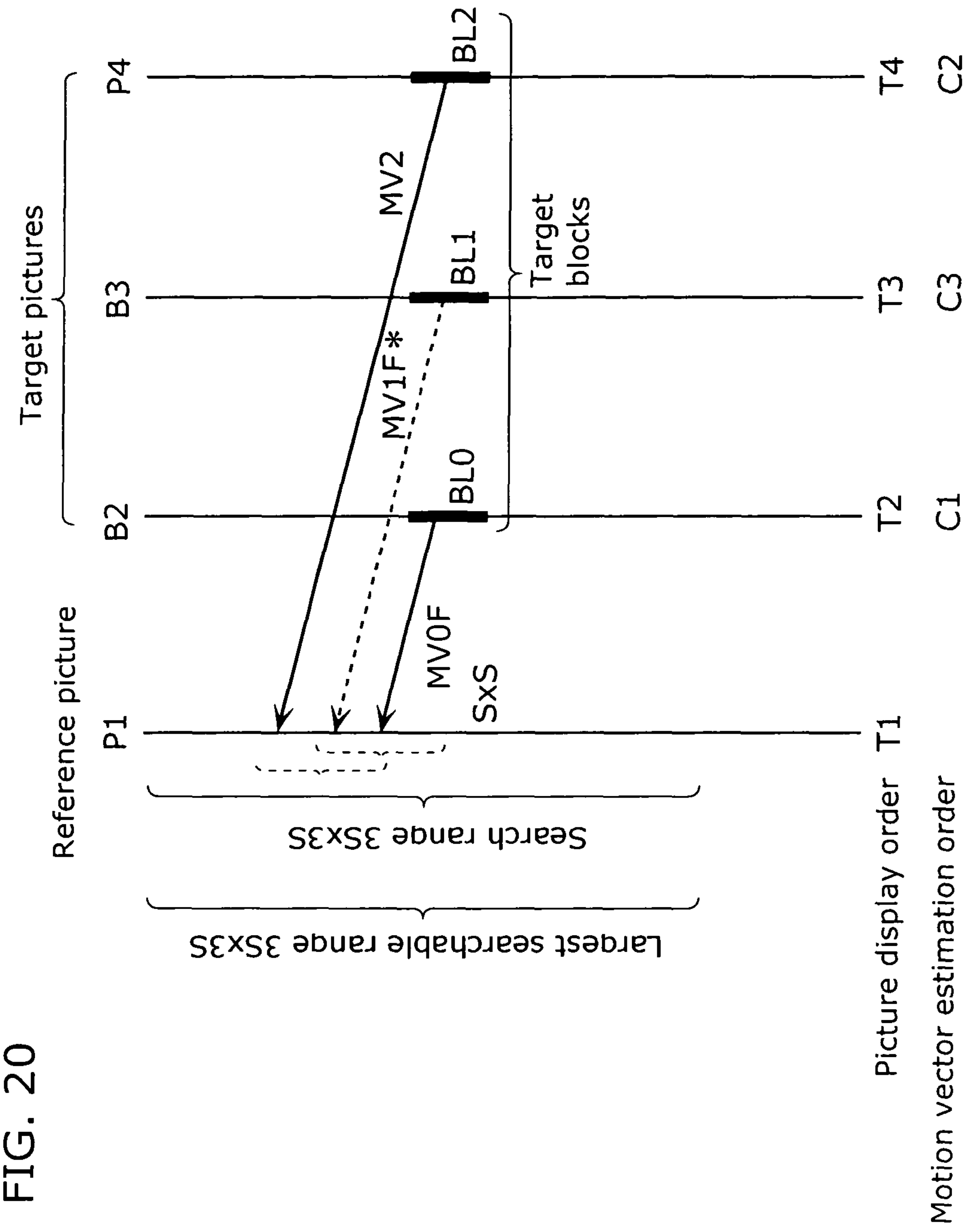
FIG. 20 is a figure which shows the prediction motion vector calculation method in a sixth modification of the present invention.

FIG. 20 is a figure which shows the prediction motion vector calculation method in the sixth modification. First, the motion vector estimation unit 121 estimates the motion vector (forward motion vector) MV0F for the target block BL0 which is included in the picture B2, the picture B2 being the closest picture to the reference picture P1 among the target pictures in the display order.

Further, the motion vector estimation unit 121 estimates the motion vector MV2 for the target block BL2, which is included in the picture P4, the picture P4 being the furthest picture from the reference picture P1 among the target pictures in the display order. Next, the motion vector estimation unit 121 stores the motion vectors MV0F and MV2 in the storage unit 122.

Here, for example, the search range for the motion vector for the block in the picture B2 relative to the reference picture P1 is S pixels by S lines and the display time interval between the reference picture P1 and the picture P4 is three times the display time interval between the reference picture P1 and the picture B2. In this case, the search range in the reference picture P1, which is used for estimating the motion vector MV2 for the target block BL2 is (3×S) pixels by (3×S) lines.

The prediction computation unit 123 reads out and compares the motion vector MV0F and the motion vector MV2 stored in the storage unit 122. When the motion vectors are uniform, the prediction calculation unit 123 calculates the prediction motion vector MV1F* relative to the target block BL1, which is co-located with the target blocks BL0 and BL2, by scaling the motion vector MV0F or the motion vector MV2.

The search range control unit 124 specifies a search range of S pixels by S lines centered on a position in the reference picture P1 indicated by the prediction motion vector MV1F* and defines the search range into the motion vector estimation unit 121.

The motion vector estimation unit 121 estimates the motion vector for the target block BL1 within the search range in the reference picture P1, which is defined by the search range control unit 124. In other words, after estimating the forward motion vector for the target block BL0 relative to the reference picture P1 and estimating a motion vector for the target block BL2 relative to the reference picture P1, the motion vector estimation unit 121 estimates the forward motion vector for the target block BL1 relative to the reference picture P1. Next, the motion vector estimation unit 121 stores the motion vector for the target block BL1 in the storage unit 122.

In this modification, when the orientations of each motion vector in plural pictures are respectively uniform, the accuracy of a prediction motion vector can be raised by scaling one of each motion vector in the pictures and calculating a prediction motion vector.

Note that the motion vectors within the search range indicated by the prediction motion vectors need not be estimated since the prediction motion vector calculated in this way is highly accurate. In other words, the prediction motion vectors may be managed in the same way as real motion vectors.

(Modification 7)

Below, the prediction motion vector calculation method in the present embodiment is described for a seventh modification.

In the embodiment above, when calculating a prediction motion vector for a target block relative to the reference picture, a motion vector for a block other than the target block is scaled.

In the present modification, when calculating a prediction motion vector for a target block relative to a reference picture, a motion vector for the target block relative to another reference picture is scaled.

Figure 21:
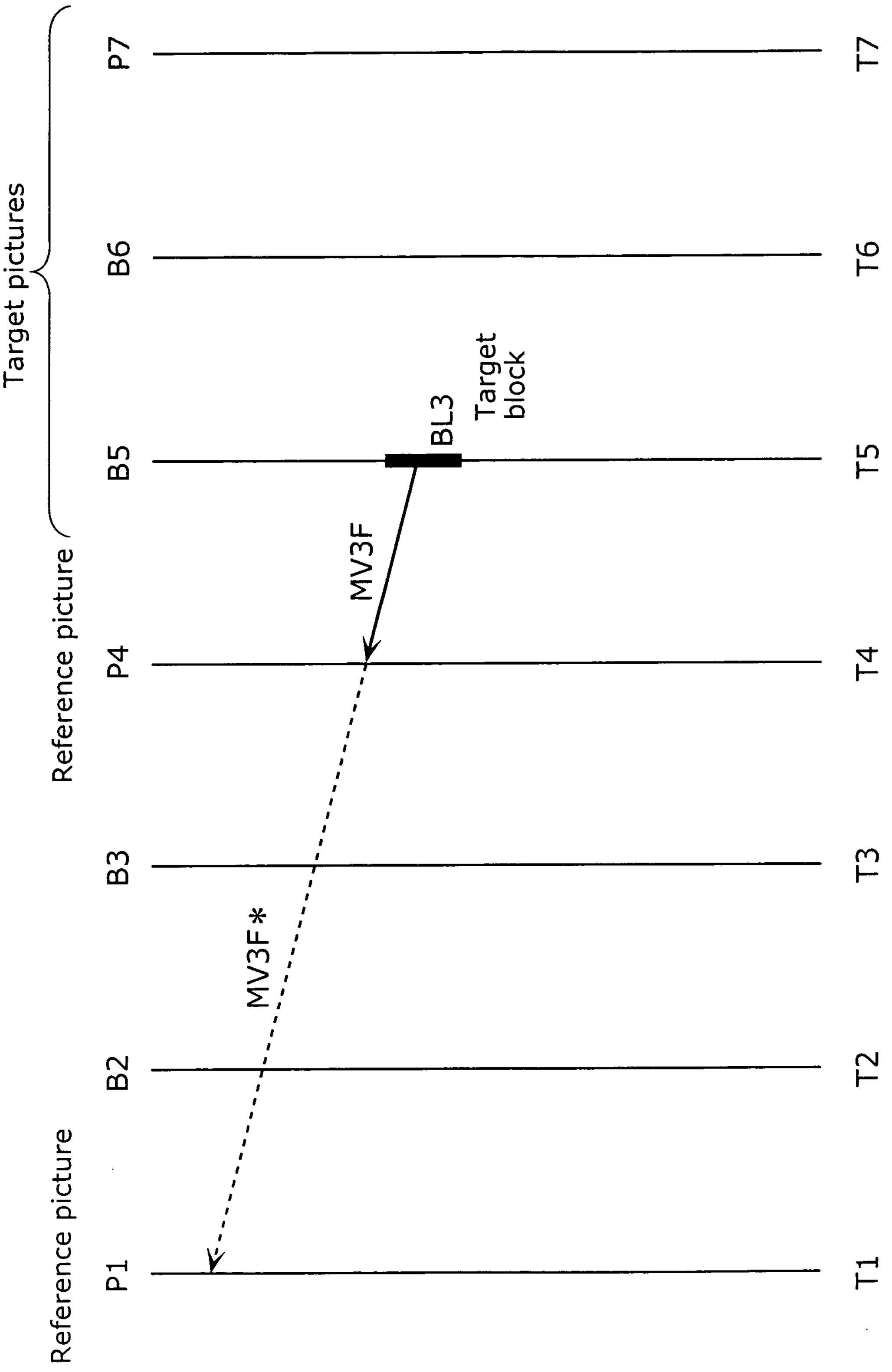
FIG. 21 is a figure which shows the prediction motion vector calculation method in a seventh modification of the present invention.

FIG. 21 is a figure which shows the prediction motion vector calculation method in the seventh modification. First, the motion vector estimation unit 121 estimates the motion vector MV3F for the target block BL3 which is included in the picture B5, relative to the reference picture P4, the picture B5 being a B picture.

The prediction computation unit 123 calculates the prediction motion vector MV3F* for the target block BL3 relative to the reference picture P1 by scaling the motion vector MV3F estimated by the motion vector estimation unit 121.

The search range control unit 124 specifies a search range of S pixels by S lines centered on a position in the reference picture P1 indicated by the prediction motion vector MV3F*, and defines the search range into the motion vector estimation unit 121.

The motion vector estimation unit 121 estimates a motion vector for the target block BL3 relative to the reference picture P1 within the search range in the reference picture P1, which is defined by the search range control unit 124. Next, the motion vector estimation unit 121 stores the motion vectors for the target block BL3 relative to the reference picture P1 in the storage unit 122.

The modification is compatible with H.264 in which plural pictures can be referenced.

(Modification 8)

Below, the search range in the present embodiment is described for an eighth modification.

In the embodiment above, motion vectors are estimated by searching within a search range in the reference picture which is centered on a position indicated by a prediction motion vector. In other words, as shown in FIG. 9, upon estimating the forward motion vector for the target block BL1 included in the picture B3, the motion vector estimation apparatus 100*a* searches for a block which has an image approximating that of the target block BL1, within only the search region (S pixels by S lines) in the reference picture P1, the search region being centered on a position indicated by the prediction motion vector MV1F* for the target block BL1.

In the present modification, a target block in the reference picture and a block spatially co-located with the target block are included in the search range in the reference picture, which is centered on a position indicated by the prediction motion vector.

Figure 22:
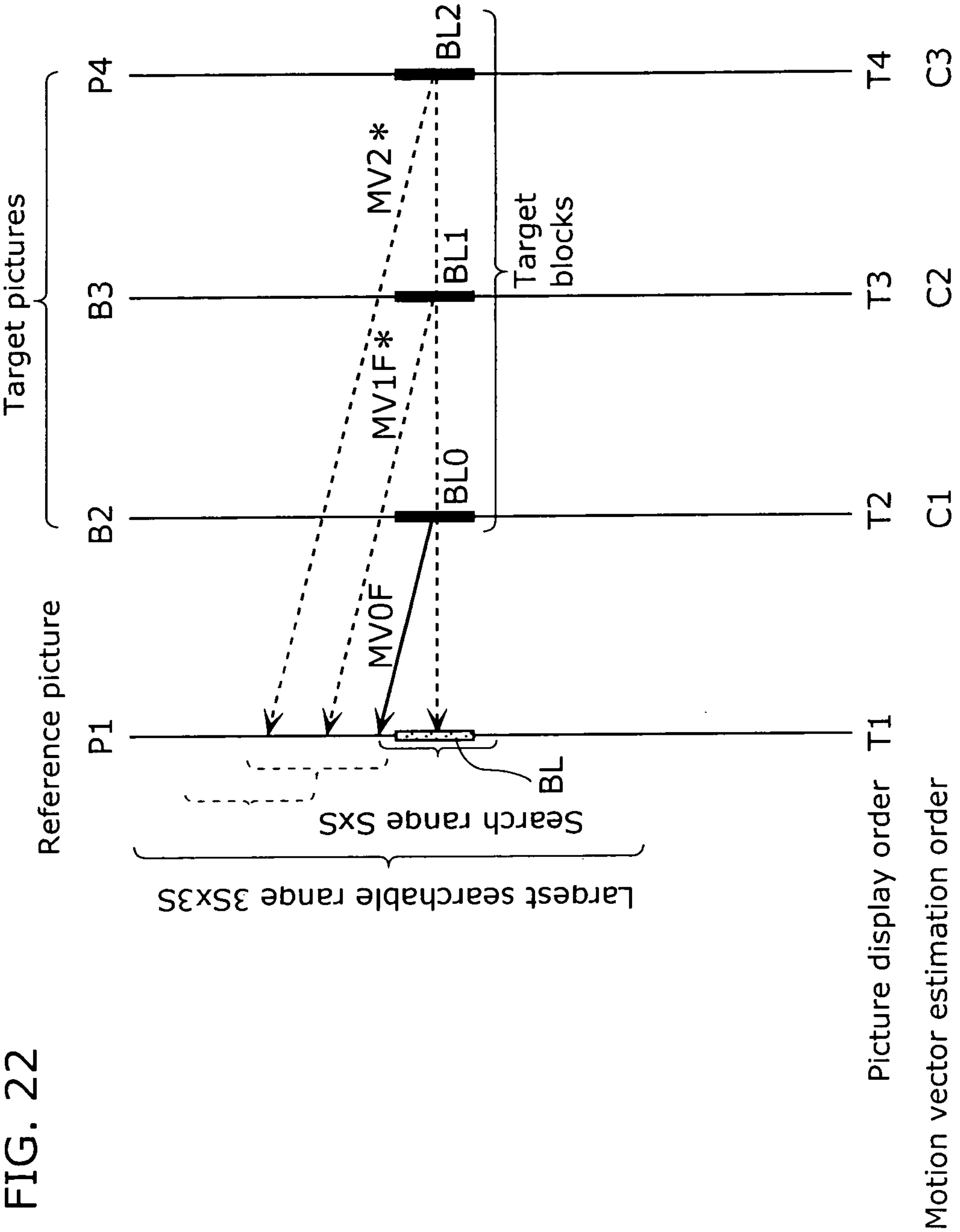
FIG. 22 is a figure which shows the search range in an eighth modification of the present invention.

FIG. 22 is a figure which shows the search range in the eighth modification. The search range control unit 124 according to the present modification includes the block BL in the reference picture P1, which is co-located with the target block BL1, into the search range (S pixels by S lines) in the reference picture P1, the search range being centered on a position indicated by the prediction motion vector MV1F*, which is calculated by the prediction computation unit 123. The search range control unit 124 includes the block BL in the reference picture, which is co-located with the target block BL2, in the search range (S pixels by S lines) in the reference picture P1, which is centered on the position indicated by the prediction motion vector MV2*, which is calculated by the prediction motion computation unit 123. The search range control unit 124 specifies a search range that includes the block BL and defines the search range into the motion vector estimation unit 121.

The motion vector estimation unit 121 estimates a forward motion vector for the target block BL1 and a forward motion vector for the target block BL2 respectively within each search range that includes the block BL in the reference picture P1.

In the above modification, it is possible to estimate an appropriate motion vector which could not be estimated within the search range of S pixels by S lines by expanding the search range.

(Modification 9)

Below, the prediction motion vector calculation method in the present embodiment is described for a ninth modification.

In the embodiment above, after calculating the forward prediction motion vector for the B picture, the backward prediction motion vector is calculated.

In the present modification, the forward prediction motion vector and the backward prediction motion vector in the B picture are calculated simultaneously by scaling the forward prediction motion vector and the backward prediction motion vector. Also, in the present modification, before calculating the prediction motion vector, two P pictures are coded and decoded beforehand.

Figure 23:
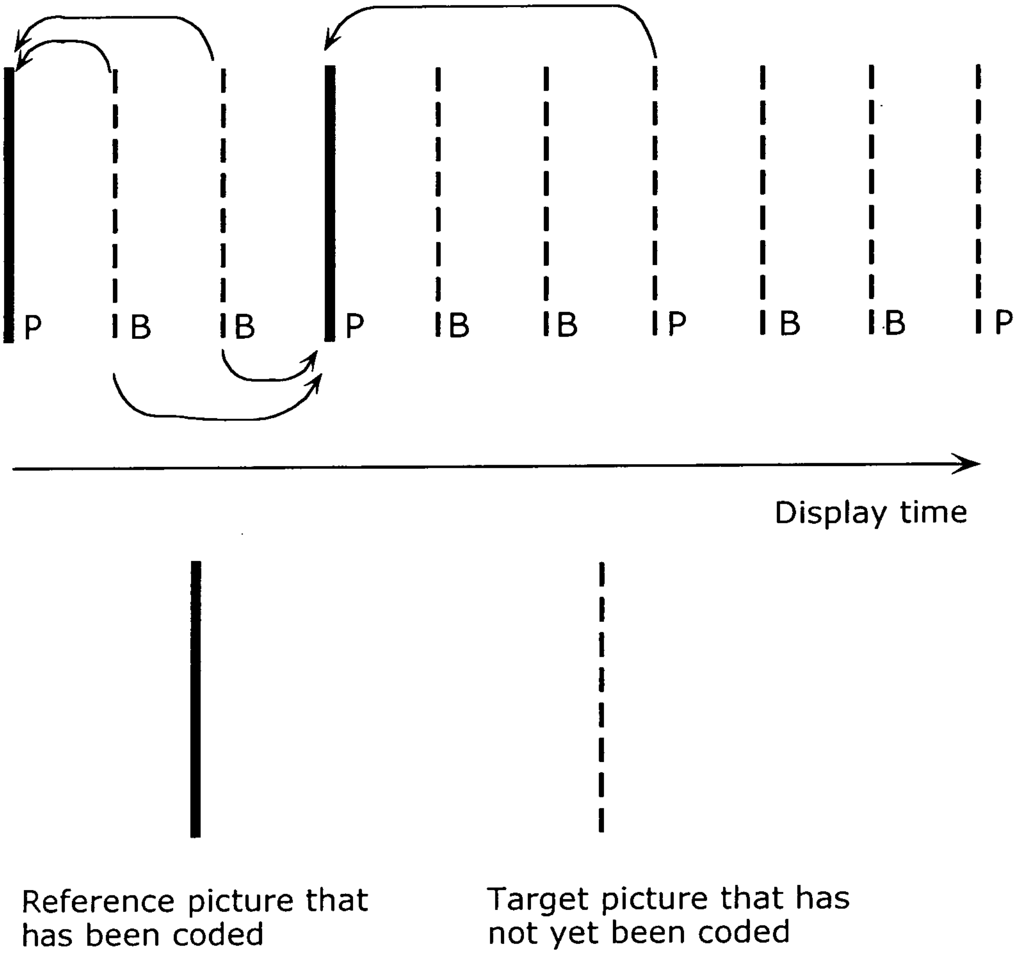
FIG. 23 is a diagram which shows the state of each picture before the prediction motion vectors are calculated, in the ninth modification of the present invention.

FIG. 23 is a diagram which shows the state of each picture before the prediction motion vectors in the ninth modification are calculated.

In the present modification, the moving picture coding apparatus 100 first codes and decodes two P pictures and stores the pictures as respective reference pictures in the picture memory 120.

Figure 24:
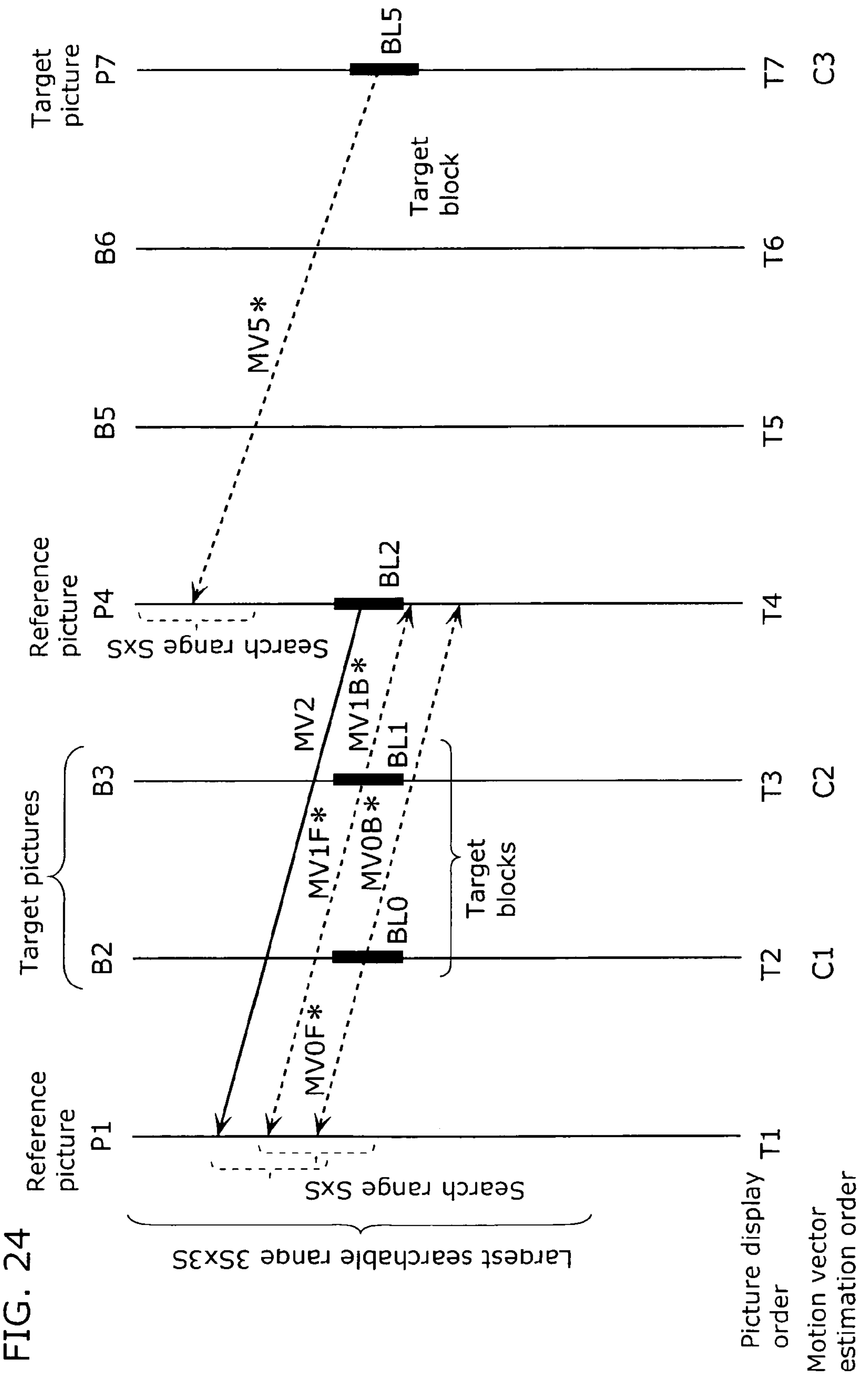
FIG. 24 is a diagram which shows the prediction motion vector calculation method in a ninth modification of the present invention.

FIG. 24 is a figure which shows the prediction motion vector calculation method in the ninth modification. In the present modification as above, the moving picture coding apparatus 100 first codes and decodes the picture P1 and the picture P4 and stores the pictures respectively in the picture memory 120 as reference pictures. Accordingly, after the coding and decoding has been performed, the motion vectors for each block in the reference picture P4 are stored in the storage unit 122.

In order to calculate a prediction motion vector for the target blocks BL0, BL1 and BL5, which are co-located with and are included in the target pictures B2, B3 and P7 respectively, the prediction computation unit 123 reads out, from the storage unit 122, the motion vector MV2 for the block BL2 in the reference picture P4, which is co-located with the target blocks BL0, BL1 and BL5.

Subsequently, the prediction computation unit 123 calculates a forward prediction motion vector MV0F*, relative to the reference picture P1, for the target block BL0 which is included in the picture B2, and a backward prediction motion vector MV0B* relative to the reference picture P4, by scaling the motion vector MV2. Further, the prediction computation unit 123 calculates the forward prediction motion vector MV1F* relative to the reference picture P1 and the backward prediction motion vector MV1B* relative to the reference picture P4 for the target block BL1 which is included in the picture B3, by scaling the motion vector MV2. Further, the prediction computation unit 123 calculates a prediction motion vector MV5*, relative to the reference picture P4, for the target block BL5 which is included in the picture P7, by scaling the motion vector MV2.

The search range control unit 124 specifies the search range (S pixels by S lines), which is centered on a position indicated by the prediction motion vector, for every prediction motion vector calculated by the prediction computation unit 123, and defines the search range into the motion vector estimation unit 121.

The motion vector estimation unit 121 estimates a motion vector within each search range defined by the search range control unit 124. In other words, the motion vector estimation unit 121 estimates the forward motion vector for the target block BL0 in the picture B2 within the search range in the reference picture P1 and estimates the backward motion vector for the target block BL0 in the picture B2 within the search range in the reference picture P4. Afterwards, the motion vector estimation unit 121 estimates the forward motion vector for the target block BL1 in the picture B3 within the search range of the reference picture P1 and estimates the backward motion vector for the target block BL1 in the picture B3 within the search range in the reference picture P4. Further, the motion vector estimation unit 121 estimates the motion vector for the target block BL5 in the picture P7 within the search range in the reference picture P4. Next, the motion vector estimation unit 121 sequentially stores the motion vectors estimated in this way into the storage unit 122.

The motion vector estimation apparatus 100*a* performs motion vector estimation on each target block while shifting co-located target blocks included in the target pictures B2, B3 and P7 respectively. Subsequently, the moving picture coding apparatus 100 codes the pictures B2, B3 and P7 using the motion vector estimated in this way, decodes the picture P7 and stores it in the picture memory 120 as a reference picture. Accordingly, after the coding and decoding has been performed, the motion vectors for each block in the picture P7 are stored in the storage unit 122.

The motion vector estimation apparatus 100*a* changes the target pictures B2, B3 and P7 for the target pictures B5, B6 and P10 and performs successive motion vector estimations as above on the target pictures B5, B6 and P10.

(Modification 10)

Below, the motion vector estimation method in the present embodiment is described for a tenth modification.

In the present modification, the moving picture coding apparatus 100 performs motion vector estimation, prediction motion vector calculation, search range specification as well as a coding and a decoding process using pipelining.

Figure 25:
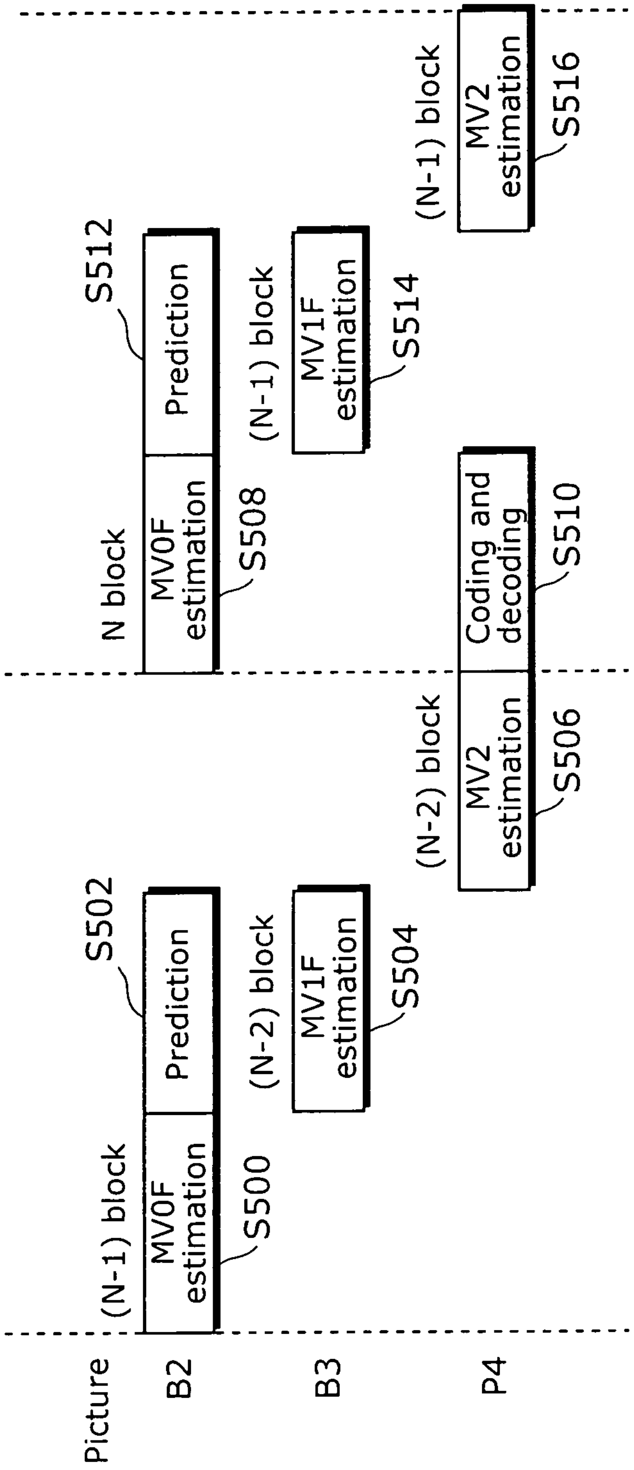
FIG. 25 is a diagram which shows pipelining in a tenth modification of the present invention.

FIG. 25 is a figure which shows pipelining in the tenth modification. First, the motion vector estimation unit 121 estimates the motion vector MV0F for the (N−1)th block BL0 of the picture B2 (Step S500).

Afterward, the prediction computation unit 123 calculates the prediction motion vectors MV1F* and MV2* for the (N−1)th blocks BL1 and BL2 respectively in the pictures B3 and P4 using the motion vector MV0F. Further, the search range control unit 124 specifies a search range indicated by the calculated prediction motion vectors MV1F* and MV2* (Step S502). While the prediction motion vector calculation and the search range specification are being performed, the motion vector estimation unit 121 estimates the motion vector MV1F for the block BL1 within the search range already specified for the (N−2)th block BL1 in the picture B3 (Step S504).

Afterwards, the motion vector estimation unit 121 estimates as above the motion vector MV2 for the block BL2 within the search range already specified for the (N−2)th block BL2 in the picture P4 (Step S506).

Next, the moving picture coding apparatus 100 codes the prediction residual image for the (N−2)th block BL2 in the picture P4 using the motion vector MV2 estimated as above, and by decoding the encoded prediction remainder, generates a re-constructed image and stores it in the picture memory 120 (Step S510). While the coding and decoding processes are being performed, the motion vector estimation unit 121 estimates the motion vector MV0F for the Nth block BL0 in the picture B2 (Step S508).

Afterwards, as above, the prediction computation unit 123 calculates the prediction motion vectors MV1F* and MV2* for the Nth blocks BL1 and BL2 in the pictures B3 and P4 respectively using the motion vector MV0F. Further, the search range control unit 124 specifies a search range indicated by the calculated prediction motion vectors MV1F* and MV2* (Step S512). While the prediction motion vector calculation and the search range specification is being performed, the motion vector estimation unit 121 estimates the motion vector MV1F for the block BL1 within the search range already specified relative to the (N−1)th block BL1 in the picture B3 (Step S514).

Afterward, the motion vector estimation unit 121 estimates, as above, the motion vector MV2 for the (N−1)th block BL2 within the search range already specified for the (N−1)th block BL2 in the picture P4 (Step S516).

Figure 26:
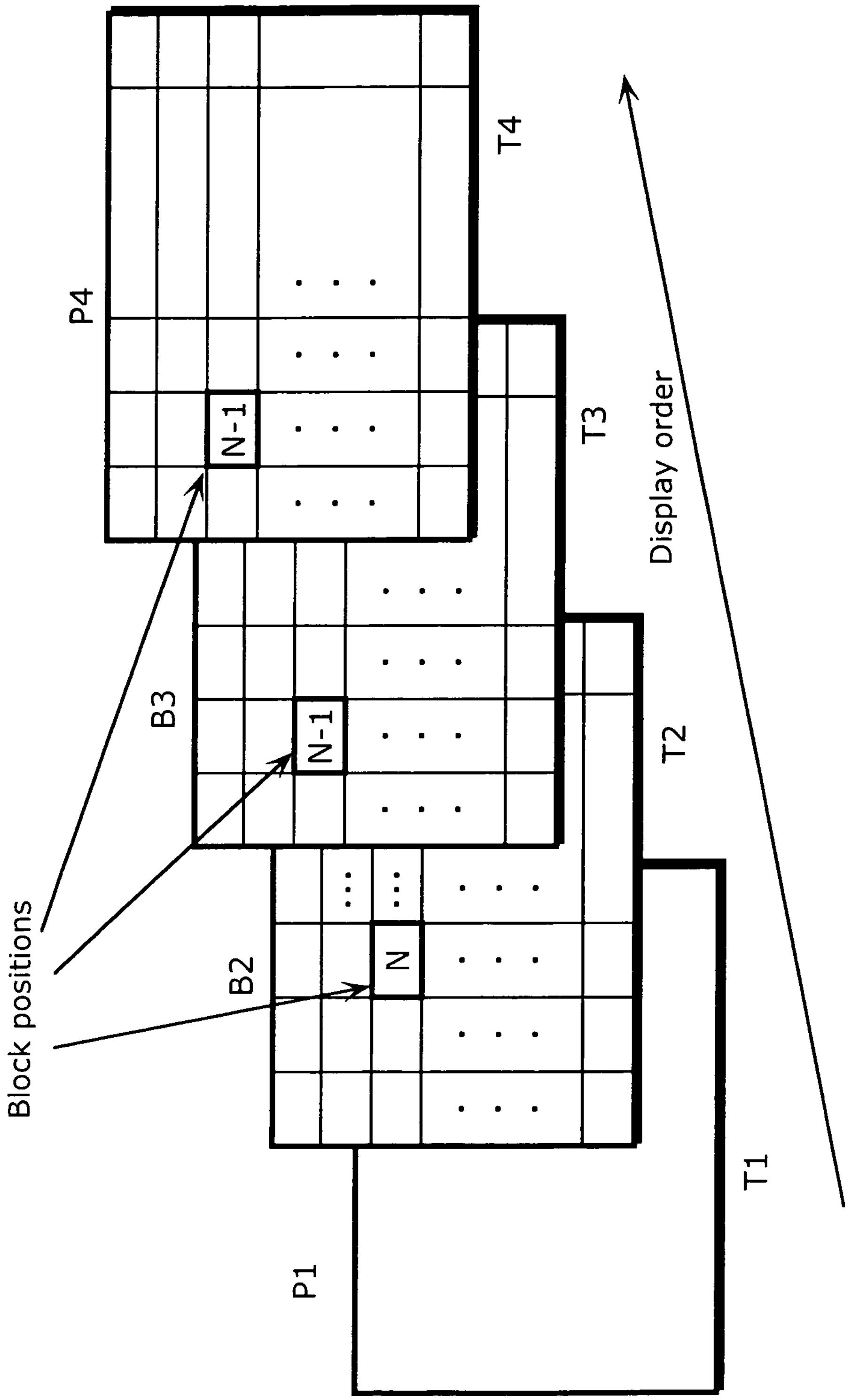
FIG. 26 is a diagram which shows the block order for motion vector estimation targets in the tenth modification of the present invention.

FIG. 26 is a figure which shows the block order for motion vector estimation targets in the present modification.

Note that the N and (N−1) shown in blocks for each picture in FIG. 26 indicate block positions in the picture.

In the present modification, after the forward motion vector for the Nth block in the picture B2 is estimated by performing pipelining, the forward motion vector for the (N−1)th block in the picture B3 is estimated and subsequently the forward motion vector for the (N−1)th block in the picture P4 is estimated.

Below, even when the moving picture coding apparatus 100 estimates a motion vector using the prediction motion vector calculation method in the ninth modification, the motion vector estimation, coding and decoding processes are performed by pipelining.

Figure 27:
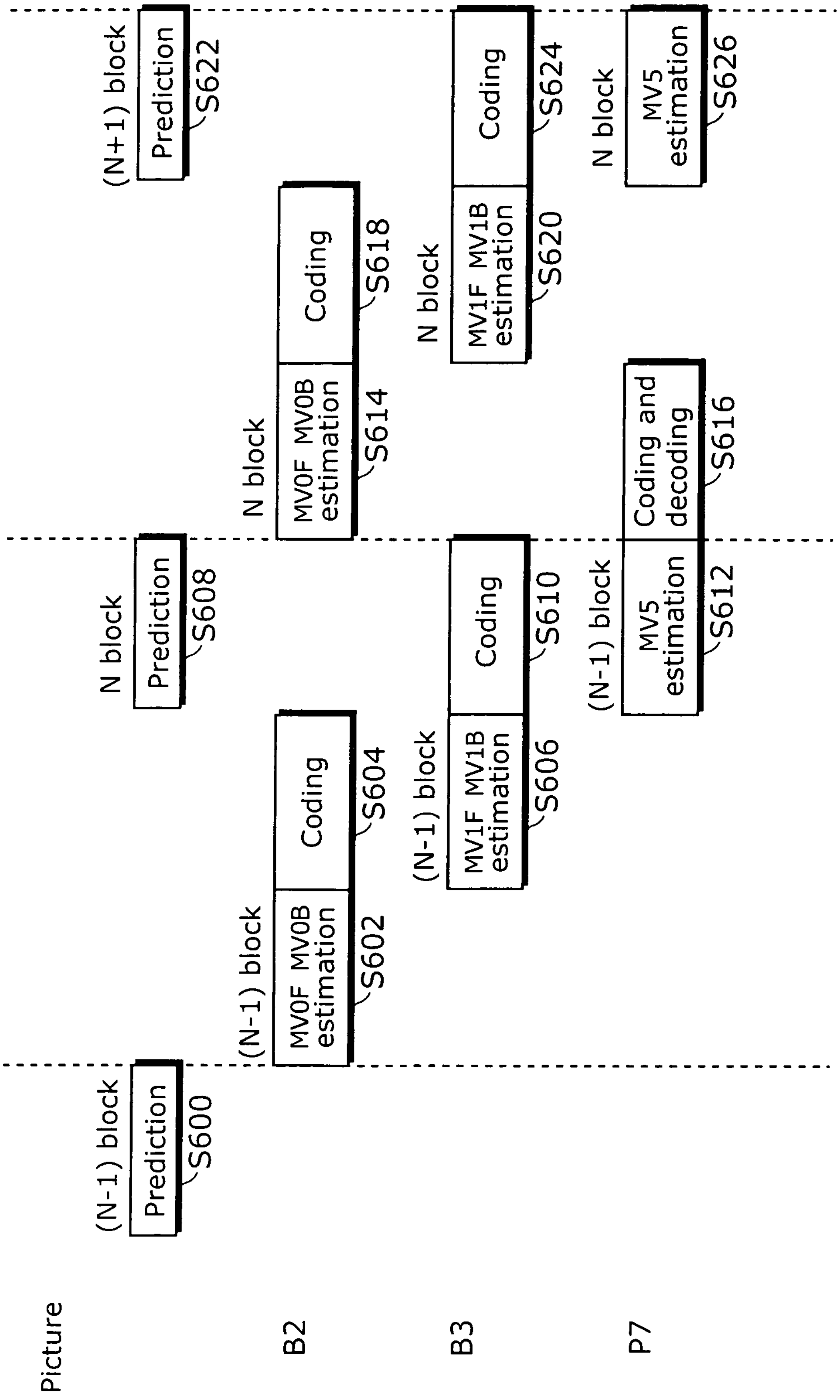
FIG. 27 is a figure which shows a different pipelining from the tenth modification of the present invention.

FIG. 27 is a figure which shows a different pipelining from the present modification. For instance, when the reference picture P1 and the reference picture P4 have already been coded and decoded, the motion vector estimation apparatus 100*a* calculates the prediction motion vectors MV0F* and MV0B* for the (N−1)th block BL0 in the picture B2, the prediction motion vectors MV1F* and MV1B* for the (N−1)th block BL1 in the picture B3 and the prediction motion vector MV5* for the (N−1)th block BL5 in the picture P7 by scaling the motion vector MV2 for the (N−1)th block BL2 in the reference picture P4. Subsequently, the motion vector estimation apparatus 100*a* specifies the respective search ranges from the calculated prediction motion vectors (Step S600).

Next, the motion vector estimation apparatus 100*a* estimates the motion vectors MV0F and MV0B for the (N−1)th block BL0 in the picture B2 (Step S602).

Subsequently, the moving picture coding apparatus 100 codes the (N−1)th block BL0 for the picture B2 using the estimated motion vectors MV0F and MV0B (Step S604). While the coding is being performed, the motion vector estimation apparatus 100*a* estimates the motion vectors MV1F and MV1B for the (N−1)th block BL1 in the picture B3 (Step S606).

Subsequently, the moving picture coding apparatus 100 codes the (N−1)th block BL1 in the picture B3 using the estimated motion vectors MV1F and MV1B (Step S610). While the coding is being performed, the motion vector estimation apparatus 100*a* estimates the motion vector MV5 for the (N−1)th block BL5 in the picture P7 (Step S612). Further, the motion vector estimation apparatus 100*a* calculates the prediction motion vectors MV0F* and MV0B* for the Nth block BL0 in the picture B2, the prediction motion vector MV1F* for the Nth block BL1 in the picture B3 and the prediction motion vector MV5* for the Nth block BL5 in the picture P7, by scaling the motion vector MV2 for the Nth block BL2 in the reference picture P4. Subsequently, the motion vector estimation apparatus 100*a* specifies a search range from the respective calculated prediction motion vectors (Step S608).

Next, the motion vector estimation apparatus 100*a* estimates the backward motion vectors MV0F and MV0B for the Nth block BL0 in the picture B2 (Step S614). Further, the moving picture coding apparatus 100 codes the prediction residual image for the (N−1)th block BL5 in the picture P7 using the motion vector MV5 estimated in Step S612, generates a re-constructed image by decoding the coded prediction residual image and stores the re-constructed image into the picture memory 120 (Step S616).

Subsequently, the moving picture coding apparatus 100 codes the Nth block BL0 in the picture B2 using the motion vectors MV0F and MV0B estimated in Step S614 (Step S618). While the coding is being performed, the motion vector estimation apparatus 100*a* estimates the motion vectors MV1F and MV1B for the Nth block BL1 in the picture B3 (Step S620).

Subsequently, the motion picture coding apparatus 100 codes the Nth block BL1 in the picture B3 using the estimated motion vectors MV1F and MV1B (Step S624). While the coding is being performed, the motion vector estimation apparatus 100*a* estimates the motion vector MV5 for the Nth block BL5 in the picture P7 (Step S626). Further, the motion vector estimation apparatus 100*a* calculates the prediction motion vectors MV0F* and MV0B* for the (N+1)th block BL0 in the picture B2, the prediction motion vector MV1F* for the (N+1)th block BL1 in the picture B3 and the prediction motion vector MV5* for the (N+1)th block BL5 in the picture P7, by scaling the (N+1)th block BL2 in the reference picture P4. Subsequently, the motion vector estimation apparatus 100*a* specifies the search range respectively from among the calculated prediction motion vectors (Step S622).

In this way, in the present modification, the overall processing time can be reduced by performing the motion vector estimation process and other processes by pipelining.

Above, the present invention is described using the embodiment and its modifications, however the present invention is not limited to these.

For example, in the tenth modification, motion vector estimation processes and other processes are performed by pipelining, however, plural motion vector estimation processes may be executed in parallel. In this case, the motion vector estimation apparatus 100*a* includes plural motion vector estimation units 121. These motion vector estimation units 121 simultaneously execute estimation, for example, of the forward motion vector MV1F for the (N−2)th block in the picture B3, shown in FIG. 25, and estimation of the motion vector MV2 for the (N−2)th block in the picture P4.

In the present invention, each functional block in the block diagram (FIG. 7 and so on) may be realized as an LSI, i.e. an integrated circuit. Each of these parts can be in plural single-function LSIs, or can also be in one integrated LSI. (For example, functions other than memory blocks can be in one integrated LSI.) The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

In the future, with advancement in manufacturing technology, a brand-new technology may replace LSI. The integration can be carried out by that technology. Application of biotechnology is one such possibility.

Also, among the functional blocks, the means for storing data which is targeted for coding or decoding may be realized in another configuration without being made into a single chip.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The motion vector estimation apparatus in the present invention performs the effect of decreasing circuit size by reducing the amount of computations for motion vector estimation and is, for instance, effective as a apparatus for generating a coded stream by coding each picture which composes a moving picture for a cellular telephone, a video camera, a DVD apparatus, a personal computer and so forth and decoding the generated coded stream.

What is claimed is:

1. A motion vector estimation apparatus comprising:

a storage unit configured to store a reference picture; and a motion vector estimation unit configured to first sequentially estimate in a display order a motion vector for each of first blocks spatially co-located among a plurality of pictures with reference to the reference picture, and then sequentially estimate in the display order a motion vector for each of second blocks spatially co-located among the plurality of pictures in a spatially different position from the first blocks.

2. The motion vector estimation apparatus according to claim 1, wherein in a case where a motion vector has already been estimated in one of the first blocks spatially co-located among the plurality of pictures before a current motion vector for another of the first blocks spatially co-located among the plurality of pictures is estimated when estimating the motion vector for each of the first blocks spatially co-located among the plurality of pictures, said motion vector estimation unit is configured to first determine a reference area found in the reference picture based on the already estimated motion vector, and then estimate the current motion vector using data found in the determined reference area.

3. The motion vector estimation apparatus according to claim 2, wherein, said motion vector estimation unit is configured to first calculate based on the estimated motion vector a prediction value of the current motion vector in the another of the first blocks spatially co-located among the plurality of pictures in which the current motion vector is to be estimated, second determine the reference area found in the reference picture based on the prediction value, and third estimate the current motion vector using data found in the determined reference area.

4. The motion vector estimation apparatus according to claim 2 or 3, wherein the reference area includes an area spatially co-located with the block in which the current motion vector is to be estimated in addition to the reference area determined based on the estimated motion vector.

5. The motion vector estimation apparatus according to claim 1, wherein said storage unit is configured to store a forward reference picture and a backward reference picture used when said motion vector estimating unit respectively executes forward reference and backward reference, and in a case where a motion vector of one of the first spatially co-located blocks has already been estimated in a picture among the plurality of pictures before a motion vector of another of the first spatially co-located blocks is estimated in a different picture among the plurality of pictures to which a bi-directional block belongs when estimating the current motion vector of the bi-directional block by executing the forward reference and the backward reference, said motion vector estimation unit is configured to first determine reference areas included in the forward reference picture and the backward reference picture based on the already estimated motion vector, and then estimate the current motion vector of the bi-directional block using data found in the determined reference areas.

6. The motion vector estimation apparatus according to claim 1, wherein in a case where a motion vector has already been estimated in one of the first blocks spatially co-located among the plurality of pictures before a current motion vector for another of the first blocks spatially co-located among the plurality of pictures is estimated when estimating the motion vector for each of the first blocks spatially co-located among the plurality of pictures, said motion vector estimation unit is configured to first calculate based on the estimated motion vector a prediction value of the current motion vector in another of the first blocks spatially co-located among the plurality of pictures in which the current motion vector is to be estimated, second determine a reference area found in the reference picture based on the prediction value, and third estimate the current motion vector using data found in the determined reference area, each of the pictures in which the motion vector is to be estimated is a picture which refers to the reference picture, and the estimated motion vector is a motion vector estimated in a picture midway through a display order among the pictures.

7. A motion vector estimation apparatus comprising:

a storage unit configured to store a reference picture; and a motion vector estimation unit configured to estimate a motion vector with reference to the reference picture stored in the storage unit, wherein, when estimating a motion vector for each of blocks which are included in each of pictures that are sequentially displayed, said motion vector estimation unit is configured to:

sequentially estimate, for each of the pictures in a display order of the pictures, a motion vector for a block located at a first spatial location in the picture; and after the motion vectors for all the blocks located at the first spatial locations of the pictures are estimated, sequentially estimate, for each of the pictures in the display order of the pictures, a motion vector for a block located at a second spatial location in the picture, and the first spatial locations each in a corresponding one of the pictures are found at a spatially same position, the second spatial locations each in a corresponding one of the pictures are found at a spatially same position, and the first spatial locations and the second spatial locations are different from each other.

* * * * *